US007803293B2

(12) United States Patent
Nagashima

(10) Patent No.: US 7,803,293 B2
(45) Date of Patent: Sep. 28, 2010

(54) OPTICAL FILM MANUFACTURING METHOD, OPTICAL FILM MANUFACTURING APPARATUS AND OPTICAL FILM

(75) Inventor: Katsusuke Nagashima, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 744 days.

(21) Appl. No.: 11/539,228

(22) Filed: Oct. 6, 2006

(65) Prior Publication Data

US 2007/0085228 A1  Apr. 19, 2007

(30) Foreign Application Priority Data

Oct. 19, 2005  (JP) ........................ 304567

(51) Int. Cl.
B29C 45/76 (2006.01)
(52) U.S. Cl. .................. 264/40.1; 264/1.6; 264/1.1; 264/2.7
(58) Field of Classification Search ........... 264/40.1, 264/160, 1.1–2.7
See application file for complete search history.

(56) References Cited

U.S. PATENT DOCUMENTS 6,190,153 B1 * 2/2001 Tsuzukiyama et al. ...... 425/135

| 2003/0111764 | A1 * | 6/2003 | Nagashima ............... 264/212 |
| 2005/0233095 | A1 * | 10/2005 | Umeda et al. .............. 428/1.1 |
| 2005/0271834 | A1 * | 12/2005 | Michihata ................ 428/1.31 |
| 2006/0270292 | A1 * | 11/2006 | Otoshi et al. ................ 442/39 |
| 2006/0270802 | A1 * | 11/2006 | Washizu et al. ............. 525/240 |

FOREIGN PATENT DOCUMENTS

| JP | 11-37649 | 2/1999 |
| JP | 11-64632 | 3/1999 |
| JP | 2002-293956 | 10/2002 |
| JP | 2004145062 | 5/2004 |
| JP | 2005-271233 | 10/2005 |

* cited by examiner

*Primary Examiner*—Khanh Nguyen
*Assistant Examiner*—Saeed M Huda
(74) *Attorney, Agent, or Firm*—Lucas & Mercanti, LLP

(57) ABSTRACT

An optical film manufacturing method, including steps of: casting a dope in which a thermoplastic resin is dissolved in a solvent, on a support so as to form a web; peeling and conveying the web from the support; measuring a physical property of the conveyed web at plural positions along a lateral direction of the web and obtaining a deviation among plural measurement values of the physical property at the plural positions: and drying the web by adjusting drying conditions at the plural positions to differ in accordance with the deviation.

15 Claims, 4 Drawing Sheets

OPTICAL FILM MANUFACTURING METHOD, OPTICAL FILM MANUFACTURING APPARATUS AND OPTICAL FILM

This application is based on Japanese Patent Application No. 2005-304567 filed on Oct. 19, 2005, in Japanese Patent Office, the entire content of which is hereby incorporated by reference.

BACKGROUND OF THE INVENTION

The present invention relates to an optical film manufacturing method and an optical film manufacturing method for manufacturing an optical film used in various forms of display apparatuses such as a liquid crystal display apparatus (LCD) or organic electroluminescent display, particularly to an optical film having a birefringence and used for a polarizing plate protecting film used in these display apparatuses and a retardation film.

Generally, a liquid crystal display apparatus is basically arranged in such a way that a polarizing plate is provided on both sides of the liquid crystal cell. The polarizing plate permits the passage of only the light on the plane of polarization in a predetermined direction. It plays a major role in the liquid crystal display apparatus in the sense of making visible a change in the light distribution of the liquid crystal due to an electric field. The performances of the liquid crystal display apparatus greatly depends on the performance of the polarizing plate.

In recent years, there has been an increasingly stringent requirement for higher display quality of a thin-film liquid crystal display apparatus. To meet this requirement, various forms of liquid crystal display methods such as VA, OCB and IPS have been proposed. To provide a wide angle of visibility, a retardation correction film is commonly employed in a liquid crystal display apparatus. A retardation film is required to provide higher and higher quality to meet the demands for a larger screen size and higher definition. This makes it necessary to satisfy the requirements for widthwise and lengthwise uniformity in film retardation values.

In addition to the absolute value for the film retardation, there is also a stringent requirement for the retardation in the direction (orientation angle) of slow phase axis (orientation axis) particularly in the retardation film having a larger in-plane retardation. An accuracy within ±1°, preferably within ±0.3° through within ±0.5° must be met over the entire film range.

In the conventional optical film production process, a dope solution made of a thermoplastic resin film material dissolved in a solvent is cast onto the rotating metal-made endless belt or a drum (support member) from a casting die, and the solvent is evaporated on the support member so that a dope film (web) is formed. After that, the web is separated by a delamination roll, and is conveyed by a conveyance roll. Then the web is dried in a drying zone, whereby an optical film is produced, according to the conventional art.

As shown in FIGS. 9 and 10, a general drying and spraying apparatus in the conventional drying zone is designed in such a way that hot air is sprayed approximately uniformly to the film 21 along the lateral direction from the tip end slit on the film side of the header chamber 22 which expands along the lateral direction of the film 21 to be conveyed, and which is connected with a hot air supply tube 23. The film 21 is dried in the process.

In the aforementioned optical film production process, particular attention is paid to ensure that the machine accuracy of the conveyance line, the temperature/air volume in the heating/drying facility, and distribution of the film thickness at the time of casting are kept uniform across the film whenever possible. However, there is a limit to the uniformity of production equipment. The required accuracy in the aforementioned retardation value/orientation angle is close to the limit of the machine accuracy. This makes it very difficult to meet the aforementioned requirements.

Further, a long-term maintenance of high accuracy involves further difficulties because of lack of uniformity on the right and left of the production line resulting from the repeated thermal strain applied to the optical film production facility and wear of the sliding portion, including chronological deterioration factors.

Then, a method of making a film thickness distribution uniform has been known in which a film thickness distribution right before a winding process is measured and a width of a slit of a casting die is adjusted based on the measurement result so as to make a film thickness distribution uniform. However, as a requested accuracy for a retardation value is increased, it become difficult to satisfy the requested accuracy with the above conventional method.

Further, even if a film thickness is uniform tight before a winding process, there may be a case that a film thickness on a process before the winding process is not uniform. Because, when the film passes a conveyance line being uneven between right and left sides, the uneven film thickness may be corrected by being applied with uneven forces by the uneven conveyance line.

Further, when a film (web) produced by the solution-casting film-forming method is stretched on the in-line basis to produce an optical film, the film (web) to be conveyed is softened by inclusion of a solvent. Accordingly, the film is heavily affected by lack of uniformity of the conveyance line on the right and left, and is easily subjected to widthwise distribution of retardation value/orientation angle. Especially, in the case that an amount of remaining solvent is greater, unevenness between right and left sides on the conveyance line affects greatly on an optical property of a film. Further, the film having been separated from the support member is subjected to widthwise distribution of optical characteristics due to irregularity in film thickness and widthwise inconsistency in drying. As a result, even if a film thickness in a final product is uniform, a distribution of an optical characteristics along a lateral direction may lowered less than a required accuracy. This widthwise distribution is conspicuous when the film formation speed is increased to improve the optical film productivity in particular.

The following Patent Documents have been disclosed to show the art of producing optical films by the solution-casting film-forming method.

[Patent Document 1] Japanese Non-Examined Patent Publication 2004-145062

The Patent Document 1 is a retardation film manufacturing method containing the step of forming polycarbonate into a cast film by the solution-casting film-forming method and the step of drawing the aforementioned unoriented cast film (unoriented film) in the direction (lateral) perpendicular to the casting direction (longitudinal). According to the method of manufacturing a retardation film disclosed in the Patent Document 1, an unoriented film or longitudinal uniaxial oriented film wherein the variation of the in-plane film thickness does not exceed 5 μm and the residual amount of solvent is 1 through 5 wt % is oriented in the lateral direction. This Patent Document 1 is intended to reduce the variation in the film thickness, thereby ensuring uniform film retardation values.

[Patent Document 2] Japanese Non-Examined Patent Publication 2002-293956

The Patent Document 2 discloses a transparent film wherein the retardation value at the center of the film is defined along the lateral direction of the transparent film made of an amorphous thermoplastic resin; at the same time, (1) the absolute value for the difference between the retardation value at the center of the film and that on the end of the film is defined; (2) the absolute value for the inclination of the retardation from the film end to the film center along the lateral direction is defined, or (3) the standard deviation of retardation along the lateral direction is defined. The Patent Document 2 is designed to reduce the variation in the film retardation.

[Patent Document 3] Japanese Non-Examined Patent Publication 1999-64632

Patent Document 3 discloses a method of manufacturing the retardation film formed by orienting the thermoplastic resin film formed by the solution cast method, wherein the film having been formed is subjected to primary orientation at a predetermined temperature, and is then subjected to secondary orientation at a predetermined lower temperature, whereby a retardation film is produced. This Patent Document 3 is intended to reduce the variation of the film retardation.

The aforementioned Patent Documents 1 through 3 disclose the method of manufacturing the optical film characterized by a smaller variation in retardation. These Patent Documents show the method of reducing the variation in retardation of the optical film wherein a basic facility and/or uniform film thickness is assumed. These techniques have a problem of solving the problem when there is a fine variation in the film thickness or when film forming equipment has widthwise lack of uniformity.

SUMMARY OF THE INVENTION

The object of the present invention is to solve the aforementioned problems of the conventional art and to provide a high-quality optical film and method producing the same, wherein, if there is a fine variation in the thickness of a conveyed film or when there is lack of uniformity along a lateral direction in film forming equipment, lack of uniformity of a retardation caused by such uniformity and related defects can be corrected, and the deviation of retardation value in a plane along a lateral direction of the film and along a thickness is within ±2%, preferably ±1%.

The present inventors have made efforts to achieve the aforementioned problems left unsolved in the conventional art, and have found out that, in a solution-casting film-forming method, lack of uniformity in the variation of thickness, conveyance tension and retardation value along the lateral direction of the film in the film making process are measured on the on-line basis, and the temperature, velocity or volume of the drying air along the lateral direction in the film making process are adjusted so as to reduce the aforementioned lack of uniformity. This procedure ensures high-precision uniformity in the optical value required of an optical film, and produces a high-quality optical film. This finding has led to the present invention.

To achieve the aforementioned object, the invention described in Item 1 is an optical film manufacturing method, comprising:

casting a dope in which a thermoplastic resin is dissolved in a solvent, on a support so as to form a web;

peeling and conveying the web from the support;

measuring a physical property of the conveyed web at plural positions along a lateral direction of the web and obtaining a deviation among plural measurement values of the physical property at the plural positions; and drying the web by adjusting drying conditions at the plural positions to differ in accordance with the deviation.

The invention described in Item 2 is the optical film manufacturing method described in Item 1, wherein at least one of a thickness, a tension and a retardation value is measured as the physical property.

The invention described in Item 3 is the optical film manufacturing method described in Item 1, wherein the drying conditions at the plural positions are adjusted to differ such that a deviation among retardation valued at the plural positions of the web after drying is minimized.

The invention described in Item 4 is the optical film manufacturing method described in Item 3, wherein at least one of a temperature, a velocity and a amount of a hot air is made to differ as the different drying condition among the plural positions.

The invention described in Item 5 is the optical film manufacturing method described in Item 4, wherein the temperature of the hot air is changed from 0.5 to 3.0° C. per 1 μm of a deviation of the thickness.

The invention described in Item 6 is the optical film manufacturing method described in Item 4, wherein the temperature of the hot air is changed from 0.2 to 0.8° C. per 1 N/m of a deviation of the tension.

The invention described in Item 7 is the optical film manufacturing method described in Item 4, wherein the temperature of the hot air is changed from 0.5 to 2.5° C. per 1 nm of a deviation of the retardation value.

The invention described in Item 8 is the optical film manufacturing method described in Item 7, wherein when the direction of a slow phase axis of a in-plane retardation substantially coincides with the lateral direction of the web, the temperature of a hot air blown onto a smaller side of the retardation value is set higher than that of a hot air blown onto a larger side of the retardation value.

The invention described in Item 9 is the optical film manufacturing method described in Item 7, wherein when the direction of a slow phase axis of a in-plane retardation substantially coincides with the conveying direction of the web, the temperature of a hot air blown onto a smaller side of the retardation value is set lower than that of a hot air blown onto a larger side of the retardation value.

The invention described in Item 10 is the optical film manufacturing method described in Item 4, wherein the velocity or the amount of the hot air is changed from 0.5 to 3.0% per 1 μm of a deviation of the thickness.

The invention described in Item 11 is the optical film manufacturing method described in Item 4, wherein the velocity or the amount of the hot air is changed from 0.3 to 0.8% per 1 N/m of a deviation of the tension.

The invention described in Item 12 is the optical film manufacturing method described in Item 4, wherein the velocity or the amount of the hot air is changed from 0.5 to 3% per 1 nm of a deviation of the retardation value.

The invention described in Item —is the optical film manufacturing method described in Item 1, wherein the drying step comprises a first drying process and a second process provided at a downstream side of the first drying process in the conveying direction, and wherein in the first drying process, at least one of the thickness and the tension is measured at the plural positions along the lateral direction of the web and the web is dried by adjusting drying conditions at the plural positions to differ in accordance with the deviation of the at least one of the thickness and the tension, and in the second drying process, the retardation value is measured at the plural positions along the lateral direction of the web and the web is dried by adjusting drying conditions at the plural positions to differ in accordance with the deviation of the retardation.

The invention described in Item 14 is an optical film manufacturing apparatus, comprising:

a support driven to rotate;

a casting die to cast a dope in which a thermoplastic resin is dissolved in a solvent, on a support;

a measuring device to measure a physical property of the web at plural positions along a lateral direction of the web while conveying the web peeled from the support; and a drying device to dry the plural positions of the web with drying powers different in accordance with the measurement values by the measuring device.

The invention described in Item 15 is the optical film manufacturing method described in Item 14, wherein the drying device dries the web by blowing air onto the web.

The invention described in Item 16 is the optical film manufacturing method described in Item 14, wherein the drying device changes at least one of a temperature, a velocity and an amount of the air.

The invention described in Item 17 is the optical film manufacturing method described in Item 14, wherein the measurement device measures a thickness of the web as the physical property.

The invention described in Item 18 is the optical film manufacturing method described in Item 17, wherein the drying device makes the drying power greater for a portion whose thickness measured by the measuring device is thicker.

The invention described in Item 19 is the optical film manufacturing method described in Item 14, wherein the measurement device measures a tension of the web as the physical property.

The invention described in Item 20 is the optical film manufacturing method described in Item 19, wherein the drying device makes the drying power greater for a portion whose tension measured by the measuring device is smaller.

The invention described in Item 21 is the optical film manufacturing method described in Item 14, wherein the measurement device measures a retardation value of the web as the physical property.

The invention described in Item 22 is the optical film manufacturing method described in Item 21, wherein the drying device makes the drying power greater for a portion whose retardation value measured by the measuring device is smaller.

The invention described in Item 23 is the optical film manufacturing method described in Item 14, wherein the drying device is provided at a downstream side of the measuring device in the conveying direction of the web.

The invention described in Item 24 is the optical film manufacturing method described in Item 14, wherein the drying device adjusts the drying powers so as to eliminate unevenness among measured values at measured positions by the measuring device.

The invention described in Item 25 is an optical film manufactured by the optical film manufacturing method described in Item 1.

According to the optical film manufacturing method described in Item 1 and the optical film manufacturing apparatus described in Item 14, a deviation of at least one of physical properties of a web such as a thickness, a tension and a retardation value along a lateral direction is measured by on-line basis during a film formation process by casing a dope, and at lest one of drying conditions such as a temperature, a velocity or an amount of a drying air is adjusted along the lateral direction of the web so as to reduce the deviation, whereby it becomes possible to obtain effects that the uniformity of a optical value such as a retardation required for a optical film can be attained with high accuracy and an optical film with excellent quality can be produced.

According to the optical film manufacturing method described in Items 2 to 12 and the optical film manufacturing apparatus described in Items 15 to 24, even when a kind or a characteristic of a thermoplastic resin film material to be formed in a film by casting is changed or even when an environment of a drying section fluctuates, by measuring a deviation of at least one of physical properties of the conveyed web along a lateral direction of the web by on-line basis and by adjusting drying conditions along the lateral direction of the web to differ within a predetermined range, it becomes possible to obtain effects that the uniformity of a optical value such as a retardation required for a optical film can be attained with high accuracy and an optical film with excellent quality can be produced.

Further, according to the optical film manufacturing method described in Item 13, even when a kind or a characteristic of a thermoplastic resin film material to be formed in a film by casting is greatly changed or even when an environment of a drying section greatly fluctuates, by combining plural deviations of the physical properties of the conveyed web with plural drying conditions along the lateral direction of the web, the uniformity of a optical value such as a retardation required for a optical film can be attained more efficiently with high accuracy. Especially, the drying conditions are changed differently in accordance with a deviation of at least one of a thickness and a tension at plural positions along the lateral direction of the web in the first drying process, thereafter, the drying conditions are changed differently in accordance with a deviation of a retardation value, whereby the retardation value can be made uniform precisely along the lateral direction of the web.

The optical film described in Item 25 is manufactured by the manufacturing method described in any one of Items of 1 to 13, whereby it is possible to manufacture a high-quality optical film wherein the deviation of the retardation value in a plane along the lateral direction of the film and along the thickness is within ±2%, preferably within ±1%.

DETAILED DESCRIPTION OF THE PREFERRED EMBODIMENT

Figure 1:
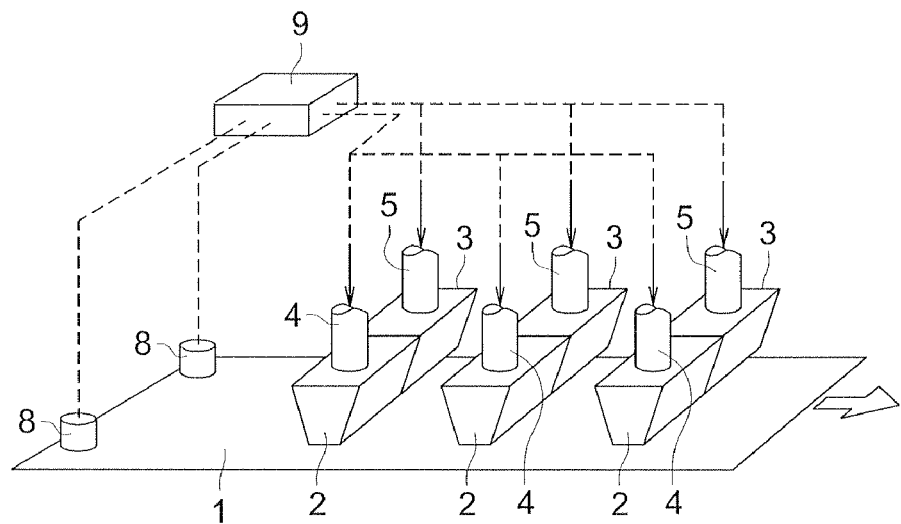
FIG. 1 is a partially enlarged perspective view representing the first embodiment of the film drying zone of the solution-casting film-forming apparatus for embodying the optical film manufacturing method of the present invention.

The following describes the best form of embodiment of the present invention without the present invention being restricted thereto:

In the method of manufacturing an optical film of the present invention, a dope in which a thermoplastic resin film material is dissolved in a solvent is cast onto a support member from a casting die, and the solvent is evaporated on the support member so that a web is formed. After that, the web is separated, and is conveyed by a conveyance roll. Then the web is dried in a drying zone, whereby an optical film is produced. Even if there is unevenness in characteristic in connection to the web (such as a fine variation in film thickness and unevenness along a lateral direction of a film producing apparatus) in a drying zone, this method corrects the unevenness (the lack of uniformity).

According to the present invention, in a solution-casting film-forming method, lack of uniformity in characteristic in connection to a web such as a thickness, a conveyance tension and a retardation value along the lateral direction of the film during a film production are measured on on-line basis, and the temperature, velocity or volume of the drying air along the lateral direction of the film in a drying process are adjusted so as to reduce the aforementioned lack of uniformity. This procedure ensures high-precision uniformity in the optical value required of an optical film.

Hereinafter, the present invention will be explained in detail.

As an optical film manufactured by the method of the present invention, the followings are listed up as desirable requirements that a production is easy, an adhesion property with an activity ray hardening type resin layer is excellent, and it is optically transparent.

Here, with regard to an optical film, transparency, as described in the present invention, refers to visible light transmittance of 60 percent or more, preferably 80 percent or more, and most preferably 90 percent or more.

The film is not particularly limited as long as it exhibits the aforesaid proper-ties. AS a resin preferably used in the present invention, a homopolymer or copolymer which has an ethylenic unsaturated monomer unit can be mentioned. More preferably, a homopolymer or copolymer of acrylic acid or methacrylate ester, such as a copolymer of polyacrylic acid methyl, polyacrylic acid ethyl, polyacrylic acid propyl, polyacrylic acid cyclohexyl, and acrylic acid alkyl, polymethyl methacrylate, polymethacrylic acid ethyl, polymethacrylic acid cyclohexyl, and methacrylic acid alkyl ester copolymer, are listed ups. Still more, since an ester of acrylic acid or methacrylic acid is excellent in transparency and compatibility, a homopolymer or a copolymer which has an acrylic ester or a methacrylate ester unit, especially a homopolymer or a copolymer which has an acrylic acid or a methyl methacrylate unit is desirable. Concretely, a polymethyl methacrylate is desirable. Acrylic acid such as polyacrylic acid and polymethacrylic acid cyclohexane, or an alicyclic alkyl ester of a methacrylic acid has advantages such as high heat-resisting property, low moisture-absorption characteristics and low birefringence, therefore these are desirable.

As the other resin preferably used in the present invention, for example, a cellulose ester resin having an acyl group substitution degree of 1.8 to 2.80, such as a cellulose acetate, a cellulose acetate propionate, a cellulose acetate butyrate, moreover, a cellulose ether resin having an alkyl group substitution degree of 2.0 to 2.80, such as cellulose methyl ether, cellulose ethyl ether, and cellulose propyl ether, cycloolefin resin, norbornane type resin, polycarbonate resin, moreover, polyamide resin of a polymer of alkylene dicarboxylic acid and diamine, moreover, a polyester resin, such as a polymer of alkylene dicarboxylic acid and diol, a polymer of alkylene diol and dicarboxylic acid, a polymer of cyclohexane dicarboxylic acid and diol, a polymer of cyclohexane diol and dicarboxylic acid, a polymer of aromatic dicarboxylic acid and diol, and a polyvinyl acetate, vinyl acetate resin such as a vinyl acetate copolymer, and polyvinyl acetal, a polyvinyl acetal resin such as a polyvinyl butyral, an epoxy resin, a ketone resin, and a polyurethane resin such as a line polymer of alkylene diisocyanate and alkylene diol, etc. can be listed, and it is desirable to contain at least one chosen from these.

Especially, a cellulose ester type resin, such as a cellulose acetate, cellulose acetate propionate, and a cellulose acetate butyrate, a cycloolefin resin, a norbornane type resin, and a polycarbonate resin are desirable. Moreover, although dope dissolving may be conducted after two or more kinds of polymers with compatibility are blended, the present invention is not limited to these.

The production method of an optical film of the present invention is conducted by a solution casting film forming method, and this is explained in detail.

(Materials to Form a Dope Solution)

Hereafter, the present invention is explained by taking a cellulose ester as an example.

A cellulose ester solution containing a cellulose ester and an organic solvent is called a dope solution, a solution casting film production is carried out with this, and thereby forming a cellulose ester film in the present invention.

(Cellulose Ester)

Cellulose as a source material of the cellulose ester of the present invention is not specifically limited, however, usable are cotton linter, wood pulp (obtained from acicular trees or from broad leaf trees) or kenaf. The cellulose esters obtained from these cellulose source materials may also be used independently or by mixing with each other in any ratio.

In the present invention, in the case that an acylation agent of a source material of cellulose is an acid anhydride (acetic anhydride, propionic anhydride, and butyric anhydride), cellulose ester can be prepared through a reaction using an organic acid such as acetic acid and an organic solvent such as methylene chloride, in the presence of a protic catalyst such as sulfuric acid. When an acylation agent is an acid chloride ($CH_3COCl$, $C_2H_5COCl$ or $C_3H_7COCl$), a reaction is carried out using a basic compound such as an amine as a catalyst. Specifically, the reaction can be carried out according to the method disclosed in JP-A No. 10-45804.

In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as a degree of acetyl substitution. For example, in the case of cellulose triacetate, all the three hydroxyl groups in one glucose unit are substituted by acetyl groups.

In a cellulose ester used for a cellulose ester film, the total degree of acetyl substitution is preferably 2.4 to 2.8.

The molecular weight of cellulose ester used in the present invention is preferably 50,000 to 200,000 in number average molecular weight (Mn), more preferably 60,000 to 200,000, and still more preferably 80,000 to 200,000.

In the cellulose ester used by this invention, the ratio Mw/Mn of a weight average molecular weight to a number average molecular weight is preferably 1.4 to 3.0, and more preferably 1.7 to 2.2.

The mean molecular weight and molecular weight distribution of cellulose ester can be measured by a fast liquid chromatography. The ratio of mass mean molecular weight (Mw) to number average molecular weight (Mn) can be calcurated from the results of measurement.

The measuring condition is as follows:
Solvent: Methylene chloride
Column: Shodex K806, K805, K803G (manufactured by Showa Denko KK). Three columns were used in connection.
Column temperature: 25° C.
Sample concentration: 0.1 mass %
Detector: RI Model 504 (manufactured by GL Science)
Pump: L6000 (manufactured by Hitachi Ltd.)
Flow rate: 1.0 ml/min
Calibration curve: Standard polystyrene STK (manufactured by Tosoh Corporation). Calibration curve using 13 samples of Mw=1,000,000 to 500. 13 samples should preferably be spaced approximately equally.

A cellulose ester of the present invention is a carboxylic acid ester having from 2 to around 22 carbon atoms. Specifically, a lower fatty acid ester of cellulose is preferable.

A lower fatty acid in the lower fatty acid ester of cellulose represents a fatty acid having 6 carbon atoms or less. Examples of a specific lower fatty acid ester of cellulose include: cellulose acetate, cellulose propionate, cellulose butyrate, cellulose acetate phthalate and mixed fatty acid esters, for example, cellulose acetate propionate and cellulose acetate butylate, which are disclosed in JP-A No. 10-45804, No. 8-231761 and U.S. Pat. No. 2,319,052. Or, an ester of an aromatic carboxylic acid and a cellulose and a cellulose acylrate described in JP-A No. 2002-179701, JP-A No. 2002-265639 and JP-A No. 2002-265638 are used preferably.

Of these, cellulose triacetate and cellulose acetate propionate are specifically preferable as the lower fatty acid ester of cellulose of the present invention. These cellulose esters may also be used in combination.

A preferable cellulose ester other than cellulose triacetate contains an acyl group having 2-4 carbon atoms as a substituent and satisfies the following Formulas (a) and (b), provided that X represents a substitution degree of an acetyl group and Y represents a substitution degree of a propionyl group or a butyryl group.

$2.4 \leq X+Y \leq 2.8$  Equation (a)

$0 \leq X \leq 2.5$  Equation (b)

Portions which are not substituted by acyl groups usually exist as hydroxy groups. These can be synthesized by well-known methods.

The acylation degree of a cellulose ester is determined according to the method specified in ASTM-D 817-96.

In the case of the acetyl cellulose, the time for acetylation should be prolonged for rising the acetylation degree. However, excessively long time for the acetylation causes simultaneously progress of decomposition and brings undesirable results caused by scission of the polymer chain and the decomposition of acetyl group. It is necessary, therefore, to set the reaction time within a certain range for raising the acetylation degree and inhibiting the decomposition within desired degree. It is unsuitable to control the reaction only by the reaction time because various conditions are applied and the reaction is largely varied depending on the conditions such as the reaction apparatus and equipment. The molecular weight distribution is expanded accompanied with the progression of decomposition of the polymer. Accordingly, the degree of the decomposition can be decided by the usually used value of the ratio of weight average molecular weight Mw to number average molecular weight Mn also in the case of the cellulose ester. Namely, the ratio of Mw/Mn can be used as an indicator of the reaction degree for carrying out acetylation reaction for sufficient time without causing excessively decomposition by the reaction for too long time.

An example of the production method for the cellulose ester is described below. One hundred parts by weight of cotton linter as the raw cellulose material was crushed and 40 parts by weight of ace-tic acid was added and subjected to a pre-activation treatment at 36° C. for 20 minutes. After that, 8 parts by weight of sulfuric acid, 260 parts by weight of acetic anhydride and 350 parts by weight of acetic acid were added to the above cotton linter and then acetylation was carried out at 36° C. for 120 minutes. The reaction system was neutralized by 11 parts by weight of 24% aqueous solution of magnesium acetate and saponified and ripened at 63° C. for 35 minutes to obtain acetyl cellulose. The acetyl cellulose was stirred at room temperature for 160 minutes using 10 times of an aqueous solution of acetic acid (acetic acid:water=1:1 in weight ratio) and then filtered and dried. Thus purified acetyl cellulose having an acetylation ratio of 2.75 was obtained. The acetyl cellulose had a Mn of 92,000, Mw of 156,000 and Mw/Mn of 1.7. Acetyl celluloses each having various acetylation degrees and Mw/Mn ratios can be synthesized by varying the acetylation conditions such as temperature, time and stirring and that of the hydrolysis.

The synthesized cellulose ester is preferably subjected to purification for removing low molecular weight component and to filtration for removing un-acetylated and low-acetylated components.

The mixed acid cellulose ester can be obtained by the method described in Tokkai Hei 10-45804. The acylation degree can be measured according to the method prescribed in ASTM-D817-9.

The cellulose ester is influenced by very small quality of metal component contained therein. It is supposed that the presence of the metal component is related to the water used in the production process of the cellulose ester. The component capable of forming an insoluble nucleus is preferably small in the amount. The amount of a metal ion such as iron, calcium and magnesium is preferably small because such the ion sometimes forms an insoluble substance by foaming a slat with a polymer decomposition product having a possibility of containing an organic acid group. The content of the iron (Fe) component is preferably not more than 1 ppm. The component of calcium (Ca) is much contained in ground water and river water, and water having a high content of the calcium ion becomes hard water, which is unsuitable for drinking water. The calcium component tends to form a coordination compound or a complex with an acidic component such as carboxylic acid or sulfonic acid or many kinds of ligand and causes scum (precipitation and turbid of insoluble compound) derived from the insoluble calcium compound.

The amount of the calcium (ca) component is not more than 60 ppm, and preferably from 0 to 30 ppm. The amount of the magnesium (Mg) component is preferably from 0 to 70 ppm, and particularly preferably from 0 to 20 ppm, because the excessive presence of the magnesium component forms an insoluble substance. The amount of the metal components such as iron (Fe), calcium (Ca) and magnesium (Mg) can be measured by inductively coupled plasma-atomic emission spectrometry (ICP-AES) after a pretreatment in which an absolutely dried cellulose ester sample is subjected to decomposition by a micro-digesting wet decomposition apparatus (decomposition by sulfuric acid and nitric acid) and alkali fusion.

(Dope Solution)

Organic solvents used for a dope, in which cellulose ester is dissolved, include chlorine based organic solvents and non-chlorine organic solvents. Methylene chloride which is one of chlorine based organic solvents is suitable for dissolving cellulose ester, specifically cellulose acetate. A non-chlorine based organic solvent may also be used.

Examples of a non-chlorine based organic solvent include: methyl acetate, ethyl acetate, amyl acetate, acetone, tetrahydrofuran, 1,3-dioxolane, 1,4-dioxane, cyclohexanone, ethyl formate, 2,2,2-trifluoro ethanol, 2, 2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol and nitroethane.

When these organic solvents are used to dissolve cellulose acetate, an ambient temperature dissolving technique is useful, however, an elevated temperature dissolving technique, a cooled solvent dissolving technique, and a high pressure dissolving technique are also preferable since the insoluble portion is reduced. Methylene chloride is preferably used, however, methyl acetate and ethyl acetate and acetone are also preferably used. Of these, methyl acetate is specifically preferable. An organic solvent in which a cellulose ester is well dissolved is called "a good solvent". An organic solvent which mainly contributes for dissolution and mainly contained in a solution is called "a main organic solvent".

In a dope used in the present invention, 1 to 40% by weight of alcohol having a carbon number of 1 to 4 is preferably added in addition to the above described organic solvent. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent. Examples of an alcohol having a carbon number of 1 to 4 include: methanol, ethanol, n-propanol, iso-propanol, n-butanol, sec-butanol and tert-butanol. Among these alcohols, ethanol is specifically preferable, because ethanol is stable, having a low boiling point, being easy to evaporate and non-toxic. Since these organic solvent has not solubility independently for a cellulose ester, these are referred to as "a poor solvent".

In order to maintain a high quality surface of a film, the concentration of cellulose ester is preferably 15 to 30% by weight, and the viscosity of a dope is preferably 10 to 500 Pa·s.

As additives added in a dope solution, there are fine particles, such as a plasticizer, a UV absorber, an antioxidant, a dye, and matting agent. In the present invention, these additives may be added in the case of manufacture of a cellulose ester solution, or may be added in the case of manufacture of a fine particle dispersion liquid of such as a matting agent.

It is desirable to add a plasticizer which gives heat resistance and moisture resistance, an antioxidant and a UV absorber, etc. to the polarizing plate used for a liquid crystal image display device.

Hereafter, Additives are explained.

(Plasticizer)

In the present invention, into a cellulose ester solution or a dope solution, it is desirable to add a compound known as a so-called plasticizer for the purposes of improving a mechanical property, providing a flexibility, providing a water absorbent-proof, reducing a water vapor permeation rate, and adjusting a retardation, for example, phosphate ester and carboxylate ester are preferably used for it.

As phosphate ester, for example, triphenyl phosphate, tricresyl phosphate, phenyl diphenyl phosphate, etc. can be listed up.

As carboxylate ester, phthalic ester and citrate ester, as phthalic ester, for example, dimethyl phthalate, diethyl phosphate, dioctyl phthalate, diethyl hexyl phthalate, etc., as citrate ester, citric acid acetyl triethyl and citric acid acetyl tributyl are listed up. Moreover, in addition to this, butyl oleate, methyl ricinoleate acetyl, sebacic acid dibutyl, triacetin, etc. are listed up. Alkyl phthalyl alkyl glycolate is also preferably used for this purpose. An alkyl of alkyl phthalyl alkyl glycolate is an alkyl group having carbon atom numbers of 1-8. As alkyl phthalyl alkyl glycolate, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, propyl phthalyl ethyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, Octyl phthalyl ethyl glycolate etc. can be mentioned, and preferably, methyl phthalyl methyl glycolate, ethyl phthalyl ethyl glycolate, propyl phthalyl propyl glycolate, butyl phthalyl butyl glycolate, and octyl phthalyl octyl glycolate can be used. Moreover, these alkyl phthalyl alkyl glycolate may be used as a mixture of two or more kinds.

Further, a polyalcohol is also preferably used.

A polyalcohol used in the present invention is represented by formula (1).

$$R_1-(OH)_n \qquad \text{Formula (1)}$$

Wherein: $R_1$ represents an organic acid having a valence of n, n represents a positive integer of 2 or more and OH represents an alcoholic and/or a phenolic hydroxyl group.

A polyalcohol ester consists of an ester of an aliphatic polyalcohol having a valence of two or mor and monocarboxylic acid, and preferably includes an aromatic ring or a cycloalkyl ring in a molecule. An aliphatic polyalcohol having a valence of 2 to 20 is preferable.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol (polyvalent alcohol) ester, carboxylic acid may be used alone or in combination of two or more carboxylic acids. Hydroxyl groups in a polyalcohol may be completely esterified or only partially esterified remaining unsubstituted hydroxyl groups.

It is desirable that these compounds are contained 1 to 30% by weight to a cellulose ester, more preferably, contained 1 to 20% by weight. Further, in order to suppress bleed-out under stretching and drying processes, it is desirable that these compounds are compounds having a vapor pressure of 1400 Pa or less at 200 degrees C.

These compounds are may be added with cellulose ester and a solvent in the case of manufacture of a cellulose ester solution, or these compounds may be added during solution preparation or after preparation.

As other additives, polyester and polyester ether described in a Japanese Patent O.P.I. Publication No. 2002-22956, polyurethane resin described in a Japanese Patent O.P.I. Publication No. 2003-171499, rosin and a rosin derivative, and epoxy resin, a ketone resin, a toluenesulfonamide resin described in a Japanese Patent O.P.I. Publication No. 2002-146044, an ester of carboxylic acid and a polyvalent alcohol described in a Japanese Patent O.P.I. Publication No. 2003-96236, a composition represented by the general formula (1) described in a Japanese Patent O.P.I. Publication No. 2003-165868, a polyester polymer or a polyurethane polymer described in a Japanese Patent O.P.I. Publication No. 2004-292696 may be listed up. These additives may be contained in a dope solution or a fine particle dispersion liquid.

Ultraviolet (UV) Absorber

In the present invention, a ultraviolet absorber may be contained in a cellulose ester film.

Examples of a UV absorber used in the present invention include: oxybenzophenone-based compounds, benzotriazole-based compounds, salicylate-based compounds, benzophenone-based compounds, cyanoacrylate-based compounds, nickel complex-based compounds and benzotriazole-based compounds. Among these, benzophenone-based compounds and, which exhibit negligible coloring, are specifically preferable. UV absorbers disclosed in JP-A Nos. 10-182621, 8-337574, and 2000-72782 and a polymer UV absorber disclosed in JP-A Nos. 6-148430, 2002-31715, 2002-169020, 2002-47357, 2002-363420, and 2003-113317 are also preferable. A UV absorber preferably has a superior absorbance in a wavelength range of 370 nm or less, in order to prevent deterioration of a polarizing element or a display under UV rays, and has a smaller absorbance in the visible light region at a wavelength range of 400 nm or more, in order to provide a superior image quality of a liquid crystal display.

Specific examples of a preferable benzotriazole-based UV absorber include: 2-(2'-hydroxy-5'-methylphenyl)benzotriazole, 2-(2'-hydroxy-3',5'-di-tert-butylphenyl) benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2H-benzotriazole-2-yl)-6-(normal chain and side chain dodecyl)-4-methylphenol, and a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate. However, the present invention is not limited thereto. Commercially available Tinuvin 109, Tinuvin 171 and Tinuvin 326 (all produced by Ciba Specialty Chemicals Inc.) may also be preferably used. As a macromolecule UV absorber, a reaction type UV absorber RUVA-93 by Otsuka chemistry company can be mentioned as an example.

Examples of benzophenone-based compounds include: 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane). However, the present invention is not limited thereto.

As a UV absorber of the above-mentioned description preferably used by the present invention, since a benzotriazole type UV absorber or benzophenone type UV absorber has high transparency and is excellent in the effect to prevent deterioration of a polarizing plate and a liquid crystal element, these are desirable, and especially the benzotriazole type UV absorber which has less unnecessary coloring is used preferably.

The method of adding an ultraviolet absorber to the dope solution is not limited when the compounds are soluble in the solvent. However, in the present invention, a UV absorber is preferably preliminarily dissolved in, a solvent which is a good solvent for a cellulose ester, for example, methylene chloride, methyl acetate, and dioxolane or a mixed solvent of a good solvent and a poor solvent, for example, a lower aliphatic alcohol (methanol, ethanol, propanol or butanol), and then the ultraviolet absorber is added as a ultraviolet absorber solution in a cellulose ester solution. Or, an ultraviolet absorber may be added directly in a dope composition. As to a composition like inorganic powder not being dissolved in an organic solvent, it is added into a dope after it is dispersed into an organic solvent and a polymer by using a dissolver and a sandmill.

The content of a UV absorber is 0.01 to 5% by weight, especially 0.5 to 3% by weight.

In the present invention, these UV absorbers may be used independently or may be used as a mixture of two or more different kinds.

(Antioxidant)

As such an antioxidant, a hindered-phenol type compound is used preferably. For example, 2,6-di-t-butyl-p-cresol, a penta ERIS retail-tetrakis [3-(3,5-di-t-butyl-4 hydroxyphenyl)propionate], triethylene glycol-bis[3-(3-t-butyl-5-methyl-4 hydroxyphenyl)propionate], 1,6-dihydroxyhexane-bis [3-(3,5-di-t-butyl-4 hydroxyphenyl)propionate], 2 and 4-bis-(n-octylthio)-6-(4-hydroxy-3,5-di-t-butyl anilino)-1,3, and 5-triazine, 2 and 2-chio-diethylenebis[3-(3,5-di-t-butyl-4 hydroxyphenyl)propionate], Octadecyl-3-(3,5-di-t-butyl-4 hydroxyphenyl)propionate, N and N'-hexamethylene bis(3, 5-di-t-butyl-4-hydroxy-hydrocinnamide), 1,3, and 5-trim-ethyl-2,4,6-tris (3,5-di-t-butyl-4-hydroxy benzyl)benzene, tris-(3,5-di-t-butyl-4-hydroxy benzyl)-isocyanurate, etc. may be listed. In particular, 2,6-di-t-butyl-p-cresol, a penta eris-retil-tetrakis[3-(3,5-di-t-butyl-4 hydroxyphenyl)propionate], and a triethylene glycol-bis[3-(3-t-butyl-5-methyl-4 hydroxyphenyl)propionate] are desirable. Moreover, for example, phosphorus type processing stabilizers, such as metal deactivator of hydrazine types, such as an N and N'-bis [3-(3,5-di-t-butyl-4 hydroxyphenyl)propionyl]hydrazine, and tris(2,4-di-t-butylphenyl)phosphight may be used together. As an added amount of these compound, an added amount of 1 ppm to 1.0% at a mass rate to a cellulose derivative is desirable, and 10-1000 ppm are still more desirable.

(Fine Particles)

In the optical film in the present invention, in order to give sliding property, fine particles such as a matting agent can be added. As the fine particles, fine particles of an inorganic compound or fine particles of an organic compound may be listed up, and as their shape, a globular shape, a plate shape, a bar shape, a needle shape, a layer shape, an unfixed shape, etc. are used.

As fine particles of an inorganic compound, a metal oxide such as a silicon dioxide, titanium dioxide, aluminium oxide, zirconium oxide, calcium carbonate, calcium carbonate, talc, clay, a baked caolin, a baked calcium silicate, hydration silicic acid calcium, aluminium silicate, magnesium silicate, and calcium phosphate, a hydroxide, a silicate, a phosphate, a carbonate can be mentioned.

As an example of fine particleses of an organic compound, fine particleses, such as a silicone resin, a fluororesin, and an acryl resin, may be listed up, a silicone resin is desirable, and one having a three dimensional net structure especially is desirable. For example, Tospal 103, 105, 108, 120, 145, 3120, and 240 (manufactured by Toshiba Silicone, Inc.) can be listed up.

Among these, since a silicon dioxide can make the haze of a film small, it is desirable. Fine particles like a silicon dioxide is subjected to a surface treatment with an organic substance in many cases. It is desirable that those fine particles can make the haze of a film small. As a desirable organic substance in the surface treatment, halo silane, alkoxy silane, silazane, siloxane, etc. can be mentioned.

When the average particle diameter of fine particles is larger, the sliding property effect becomes larger, and on the contrary, When the average particle diameter of fine particles is smaller, the transparency is more excellent. Further, the range of the average particle diameter of fine particles is 0.005-1.0 micrometers. Fine particles may be primary particles of these fine particles, or may be second particles made by aggregation. As for the content of fine particles, it is desirable to make it contained in the rage of 0.01 to 20 g per 1 $m^2$ of a resin.

As fine particles of a desirable silicon dioxide, fine particles marketed by product names of aerosil 200, 200V, 300, R972, R972V, R974, R202, R812, R805, OX50, and TT600 (manufactured by Japanese Aerosil Co.) can be mentioned, for example. Aerosil 200V, R972, R972V, R974, R202, and R812 can be used preferably. These particles can be used two or more kinds in combination. When two or more kinds are used in combination, these can be used at arbitrary mixing ration. In this case, different particles in average particle diameter and material, for example, Aerosil 200V and R972 can be used within a range of 0.1:99.9 to 99.9:0.1 in mass ratio.

Existence of the fine particles in the film used as the above-mentioned matting agent can be used as another purpose for the improvement in strength of a film.

(Surfactant)

It is desirable to contain a surfactant in a dope solution or a fine particle dispersion liquid used by the present invention, and the surfactant is not limited in particular to a phosphoric acid type, a sulfonic acid type, a carboxylic acid type, a nonion type, a cation type, etc. These are described in a Japanese Patent O.P.I. Publication No. 61-243837, for example. As for the added amount of a surfactant, 0.002 to 2% by weight to a cellulose acylrate is desirable, and 0.01 to 1% by weight is more desirable. If the added amount is less than 0.001% weight, the addition effect may not fully be demonstrated, but the added amount exceed 2% by weight, it may deposit or a non-dissolved component may be produced.

As a nonion type surfactant, there is a surfactant having polyoxyethylene, polyoxypropylene, polyoxybutylene, polyglycidyl and sorbitan as a nonion type hydrophilicity group, and more concretely, polyoxyethylene alkyl ether, polyoxyethylene alkyl phenyl ether, polyoxyethylene polyoxypropylene glycol, polyhydric alcohol fatty acid partial ester, polyoxyethylene polyvalent alcohol fatty acid partial ester, polyoxyethylene fatty acid ester, poly glycerine fatty acid ester, fatty acid diethanol amide, and triethanolamine fatty acid partial ester can be mentioned.

As an anion type surfactant, there are carboxylate salt, sulfate salt, and sulfonate salt, phosphate salt, and as a typical one, there is a fatty acid salt and alkyl bezel sulfonate salt, an alkyl naphthalene sulfonic acid salt, an alkyl-sulfonic-acid salt, α-olefin sulfonic acid salt, dialkyl sulfo succinate, α-sulfonation fatty acid salt, N-methyl-N oleyl taurine, petroleum sulfonate salt, alkyl sulfate salt, sulfated oil fat, polyoxyethylene alkyl ether sulfate salt, polyoxyethylene alkyl phenyl ether sulfate salt, polyoxyethylene styrene-ized phenyl ether sulfate, alkyl phosphate, polyoxyethylene alkyl ether phosphate salt, a naphthalene sulfonic acid salt formaldehyde condensate, etc.

As a cation type surfactant, an amine salt, a quarternary ammonium salt, a pridium salt, etc. may be listed, and the 1st to 3rd fatty amine salt, and a quarternary ammonium salt (tetra-alkyl ammonium salt, tri alkyl benzyl ammonium salt, an alkylpridium salt, an alkyl imidazolyl salt, etc.) can be listed. As an amphoteric type surfactant, calboxy betaine, sulfo betaine, etc., and they are N-tri alkyl-N-calboxy methyl ammonium betaine, N-tri alkyl-N-sulfo alkylene ammonium betaine, etc. can be listed.

A fluorine type surfactant is a surfactant which makes a fluorocarbon chain as a hydrophobic group.

(Peeling Accelerator)

Furthermore, a peeling accelerator for making load at the time of peeling small may be added in a dope solution. As a peeling accelerator, a surfactant is effective and there is a phosphoric acid type, a sulfonic acid type, a carboxylic acid type, a nonion type, a cation type, etc., however, it is not limited in particular to these. These peeling accelerators are listed in, for example, a Japanese Patent O.P.I. Publication No. 61-243837 etc. Polyethoxylized phosphate ester is disclosed a Japanese Patent O.P.I. Publication No. 57-500833 as a peeling accelerator. Japanese Patent O.P.I. Publication No. 61-69845 discloses that peeling can be conducted quickly by adding mono or di-phosphoric acid alkyl ester, whose non-esterified hydroxy group is in the form of free acid, into a cellulose ester. Moreover, Japanese Patent O.P.I. Publication No. 1-299847 discloses that peeling load can be reduced by adding a phosphate compound including a non-esterified hydroxyl group and a propylene oxide chain and inorganic substance particles.

(Other Additives)

In addition, a heat stabilizer, such as inorganic fine particles, such as kaolin, talc, a diatom earth, quartz, calcium carbonate, barium sulfate, a titanium oxide, and alumina, and a salt of alkaline earth metals, such as calcium, and magnesium may be added. Furthermore, an antistatic additive, a fire retardant, lubricant, an oily agent, etc. may be added.

Figure 8:
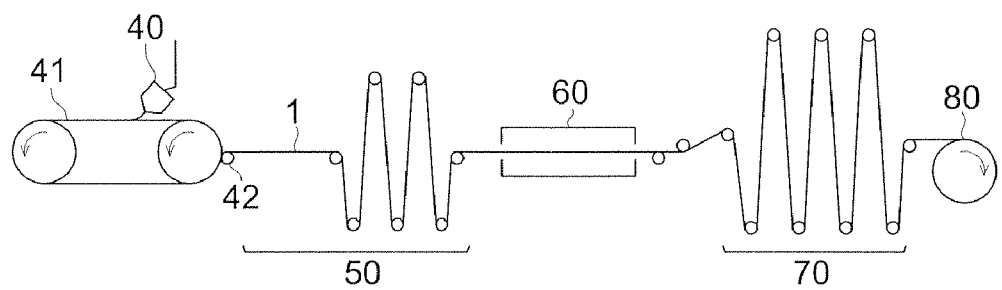
FIG. 8 is a outlined side view of a solution-casting film-forming apparatus to conduct an optical film manufacturing method according to the present invention.
Figure 9:
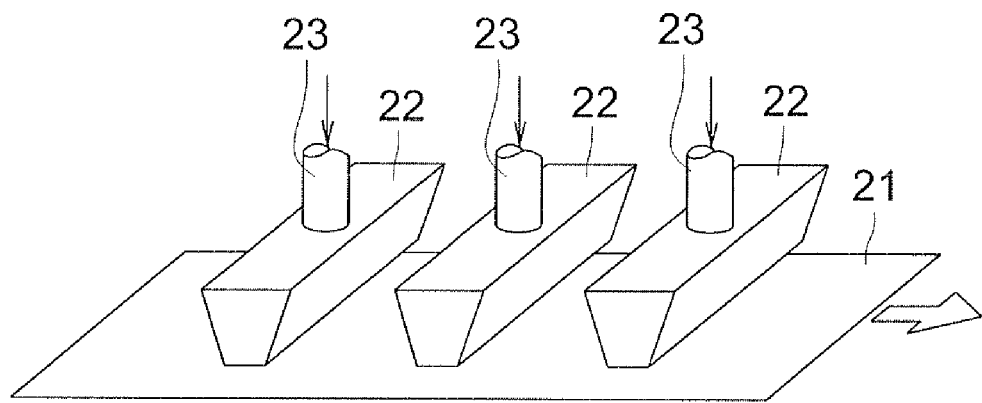
FIG. 9 is a partially enlarged perspective view representing the film drying zone of the solution-casting film-forming apparatus for embodying the optical film manufacturing method according to the conventional art.
Figure 10:
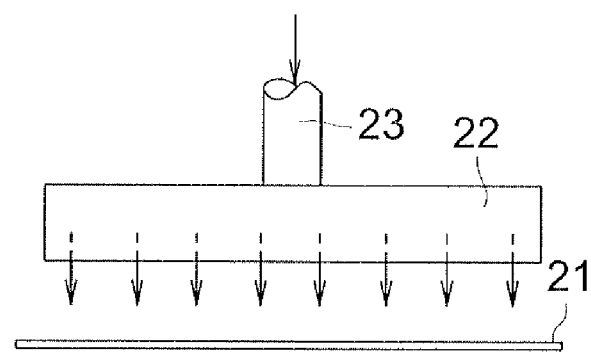
FIG. 10 is a partially enlarged front view in FIG. 9.

An optical film manufacturing apparatus shown in FIG. 8 is an example according to the present invention and comprises a support 41 driven to rotate; a casting die 40 to cast a dope in which a thermoplastic resin is dissolved in a solvent, on the support; a peeling roller 42 to peel a web 1 from the support, a pre-drying section (drying means) 50 to dry the peeled and conveyed web 1; a stretching section 60 to stretch the web 1; a post-drying section 70 to further dry the stretched web, and a winding roller to wind up the dried web.

In connection to the above optical film manufacturing apparatus, the optical film manufacturing method according to the present invention owing to a solution-casting and film-forming method comprises a dope preparing process, a casting process, a drying process, a stretching process and a winding process.

Dope Preparing Process

Firstly, as an example of a thermoplastic resin film material (macromolecular material), cellulose ester will be explained. To dissolve cellulose ester, means such as the stirring dissolving method, heating dissolving method, and ultrasonic dissolving method in a still 1 are used generally, and a method for heating cellulose ester, under pressure, at the boiling point of the solvent or higher at the normal pressure and at a temperature within the range where the solvent does not boil and dissolving it by stirring is more preferable to prevent an occurrence of massive undissolved substances called gel or agglomeration. Further, the cooling dissolving method described in Japanese Patent Application 9-95538 or the method for dissolving under high pressure described in Japanese Patent Application 11-21379 may be used.

A method for mixing and wetting or swelling cellulose ester as a poor solvent and then mixing and dissolving it as a good solvent is used preferably. At this time, an apparatus for mixing and wetting or swelling cellulose ester as a poor solvent and an apparatus for mixing and dissolving it as a good solvent may be installed separately.

According to the present invention, the kind of the still (pressurizing container) used to dissolve cellulose ester is no particular object and any one which can withstand a predetermined pressure and can be heated and stirred under pressure is acceptable. On the still (pressurizing container), instruments such as a manometer and a thermometer are arranged properly. For pressurization, a method for pressing in inactive gas such as nitrogen gas or a method for heating and increasing the vapor pressure of the solvent may be used. The still 1 is preferably heated from the outside and for example, the jacket type is preferable because the temperature thereof can be controlled easily.

The heating temperature by adding a solvent is the boiling point of the solvent used or higher and when two or more mixing solvents are used, a temperature which is equal to the boiling point of the solvent having a low boiling point or higher and is within the range where the solvent does not boil is preferable. When the heating temperature is excessively high, the necessary pressure is increased and the productivity gets worse. The heating temperature is preferably within the range from 20 to 120° C., more preferably within the range from 30 to 100° C., and most preferably within the range from 40 to 80° C. Further, the pressure is regulated so that the solvent does not boil at a preset temperature.

In addition to cellulose ester and the solvent, a necessary additive such as a plasticizer or an ultraviolet absorber may be mixed with the solvent beforehand and dissolved or dispersed, and then introduced into the solvent before cellulose ester is dissolved or introduced in the dope after cellulose ester is dissolved.

After cellulose ester is dissolved, it is taken out from the container by cooling or is pulled out from the container by a pump and is cooled by a heat exchanger, thus the cellulose ester dope obtained is used to form a film and at this time, it may be cooled to the normal temperature.

In the method of the present invention, the cellulose ester dope is filtered, thus foreign substances, particularly in the liquid crystal display, foreign substances recognized as an image by mistake must be removed. It may be said that the quality as optical films is decided by this filtration.

Casting Process

The casting step is a step of sending the dope regulated by the still to a casting die by a conduit and casting the dope from the casting die to the casting position on a support body composed of an endless support body for transferring endlessly, that is, for example, an endless belt made of rotation driving stainless steel (or a drum made of rotation driving stainless steel). The surface of the support body is a mirror surface.

On the surface (casting surface) of an upper moving section of the support body composed of the endless belt wound round a pair of front-side and rear-side drums and 4b, the dope casting die for casting the dope which is a material solvent of films and a pressure reducing chamber as a pressure reducing means from the upstream side of a casting film, when forming the casting film (web) on the support body by the dope casting die, so as to form the web by adhering onto the support body are installed. Here, the front-side drum 4a round which the endless belt support body is wound is a hot water drum and the rear-side drum is a cooling water drum.

The casting die (for example, pressurizing dies), since the slit shape of the head can be regulated, can preferably make easily the film thickness uniform. As a casting die, there are a coat hanger die and a T die available and they are all used preferably. To increase the film forming speed, two casting dies are installed on the support body and the dope amount may be divided into two layers. And, the dope regulated so as to set the dope viscosity to 1 to 200 poise is cast on the support body from the casting die 2 almost to a uniform film thickness.

According to the present invention, the dope (solvent) in which cellulose ester resin is dissolved in a solvent is cast on the moving endless belt (support body) made of rotation driving metal from the casting die, thereby films are formed.

Solvent Evaporation Process

The solvent evaporation step is a step of heating a dope film (web) formed on the endless belt support body by the cast dope on the support body and evaporating the solvent until the web can be separated from the support body.

To evaporate the solvent, there are a method for blowing air from the side of the web and/or a method for transferring heat by a liquid from the rear of the support body, and a method for transferring heat by radiant heat from the front and rear.

Separation Process (Peeling Process)

The separation step is a step of separating the web with the solvent evaporated on the support body by a separation roll. The separated web is sent to the next step. When the residual solvent amount (the formula described later) of the web at time of separation is excessively large, the web is hardly separated and inversely, when it is dried sufficiently on the support body and then is separated, a part of the web is separated halfway. According to the present invention, when separating a thin web from the support body, to execute it free of deterioration of the flatness and cramping, the minimum separation tension for separating the web is preferably less than 170 N/m and more preferably less than 140 N/m.

As a method for increasing the film forming speed (the web is separated while the residual solvent amount is as large as possible, so that the film forming speed can be increased), there is a gel casting method available. There are a method for adding a poor solvent to cellulose ester during doping and gelling it after dope casting and a method for lowering the temperature of the support body 3 for gelling available. The web is gelled on the support body 3 to increase the film strength at time of separation, so that the separation is speeded up and the film forming speed can be increased. Although a residual solvent amount is changed depending on a strong or week drying condition of the web 11 on the support body 3 and the length of the support body 3, the web can be separated from the support body 3 when the residual solvent amount is within the range from 5 to 150 wt %. However, when separating the web when the residual solvent amount is larger, if the web 11 is too soft, the flatness may be damaged at time of separation, and cramping and longitudinal streaks due to the separation tension occur easily, thus in view of the economical speed and quality, the residual solvent amount at time of separation is decided. Therefore, according to the present invention, the temperature at the separation position on the support body 3 is set between 10 and 40° C., preferably between 15 and 30° C. and the residual solvent amount of the web 11 at the separation position is preferably set between 10 and 120 wt %.

To maintain good flatness of cellulose ester films at time of manufacture, the residual solvent amount when separated from the support body 3 is preferably set between 10 and 150 wt %, more preferably between 70 and 150 wt %, and particularly preferably between 100 and 130 wt %. The ratio of a good solvent contained in the residual solvent is preferably between 50 and 90%, more preferably 60 and 90%, and particularly preferably 70 and 80%.

According to the present invention, the residual solvent amount can be expressed by the formula indicated below.

$$\text{Residual solvent amount (wt \%)} = \{(M-N)/N\} \times 100$$

where M indicates the weight of the web at an optional time and N indicates the weight when the web is dried at 110° C. for 3 hours from the optional time. For measurement, for example, Gas Chromatography 5890 type SERISII and Head Space Sampler HP7694 by Hewlette-Packard can be used.

Drying Process

After separation from the support member, the web is generally dried by a roll drying apparatus (corresponding to the pre-drying section 50) for conveying the web by passing the web alternately through a plurality of conveyance rolls, and a tenter apparatus for conveying the web by sandwiching the web. The web (film) is commonly dried by hot air sprayed onto the surface of the web (film).

Figure 2:
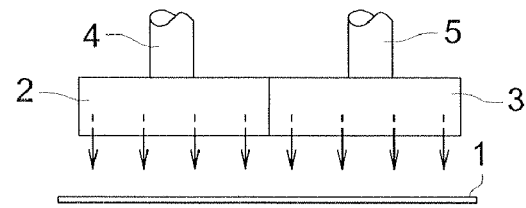
FIG. 2 is a partially enlarged front view in FIG. 1.

In the first embodiment of the method of manufacturing the optical film according to the present invention, as shown in FIGS. 1 and 2, the drying zone is provided with hot air spraying headers 2 and 3 as a drying means which are placed close to a conveyed film side by side along the lateral direction of the film and are capable of spraying hot air (dry air) having different temperatures along the lateral direction of the conveyed film; and two film thickness measuring sensors 8, 8 installed as a measuring means at two positions along the lateral direction of the film 1 close to the aforementioned headers 2 and 3 to measure the thicknesses along the lateral direction of the conveyed film 1.

In this case, either a commonly used contact type or optical or ultrasonic non-contact type can be used as the film thickness measuring sensors 8, 8. It is preferred to use the non-contact type that does not cause deformation of the conveyance film 1. The hot air spraying headers 2 and 3 are provided with hot air supply tubes 4 and 5 for supplying two forms of hot air having different temperatures from a hot air machine (not illustrated).

The hot air spraying headers 2 and 3 are designed to spray hot air to the conveyed film 1 through the slit on the tip end of the conveyed film 1 or through a punch plate.

In the present invention, the thicknesses of the conveyed film (web) 1 on the right and left are detected in real time by the film thickness measuring sensors 8, 8 on the right and left, respectively, on the on-line basis. The data on the thicknesses of the conveyed film on the right and left having been detected is converted into signals, which are sent to an external data processing apparatus 9 from the film thickness measuring sensors 8, 8 on the right and left. Receiving the detection data, the external data processing apparatus 9 obtains actually measured values for the film thicknesses on the right and left of the conveyed film 1, based on this data, and compares the actually measured values. According to a deviation of the result of this comparison, the hot air temperature blown from the hot air spraying headers 2 and 3 is changed.

In this case, drying is slower on the portion of the conveyed film 1 having greater film thickness, where a greater amount of solvent remains than on the portion of the conveyed film 1 having smaller film thickness. Thus, the film 1 tends to be stretched in the direction in which the film 1 is conveyed, with the result that retardations values along the lateral direction of the film will be different. To avoid this, the drying temperature on the thicker portion of the film is raised. Drying of the thicker portion is promoted by raising the dry air temperature, and more uniform retardation values along the lateral direction of film can be obtained.

To put it more specifically, it is preferred that hot air temperature on the thicker portion of the film should be made higher from 0.5 to 3.0° C. per 1 μm of a deviation of the thickness than that on the thinner portion of the film, in response to the values of thicknesses along the lateral direction of the conveyed film measured by the film thickness measuring sensors 8, 8 on the right and left.

As described above, according to the present invention, lack of uniformity in the variation in thickness along the lateral direction of the film in the film making process is measured on the on-line basis, and the drying air temperature blown from the hot air spraying headers 2 and 3 is adjusted so as to reduce the aforementioned lack of uniformity. Even if the conveyed film contains a fine variation in the film thickness, this arrangement corrects the lack of uniformity, thereby achieving high-precision uniformity in the optical value required of an optical film, and providing a high-quality optical film.

Figure 3:
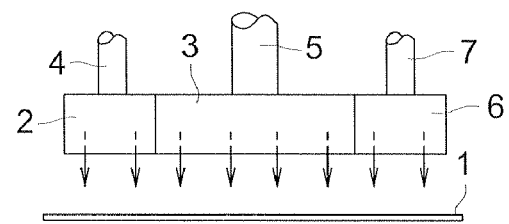
FIG. 3 is a partially enlarged front view representing a variation of the dry air spraying header in the film drying zone of FIG. 1.

FIG. 3 shows a variation of the dry air spraying header in the film drying zone. The hot air spraying headers 2, 3 and 6 are designed in a three-split structure to spray three forms of hot air (dry air) having different temperatures along the lateral direction of the conveyed film. The hot air spraying headers 2, 3 and 6 are provided with hot air supply tubes 4, 5 and 7 for supplying two forms of hot air having different temperatures from a hot air machine (not illustrated).

Figure 4:
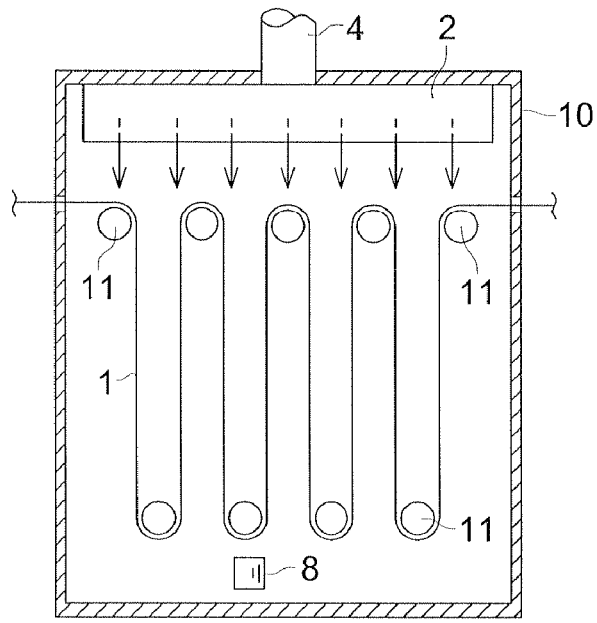
FIG. 4 is a partially enlarged vertical cross sectional view representing the second embodiment of the film drying zone of the solution-casting film-forming apparatus for embodying the optical film manufacturing method of the present invention.
Figure 5:
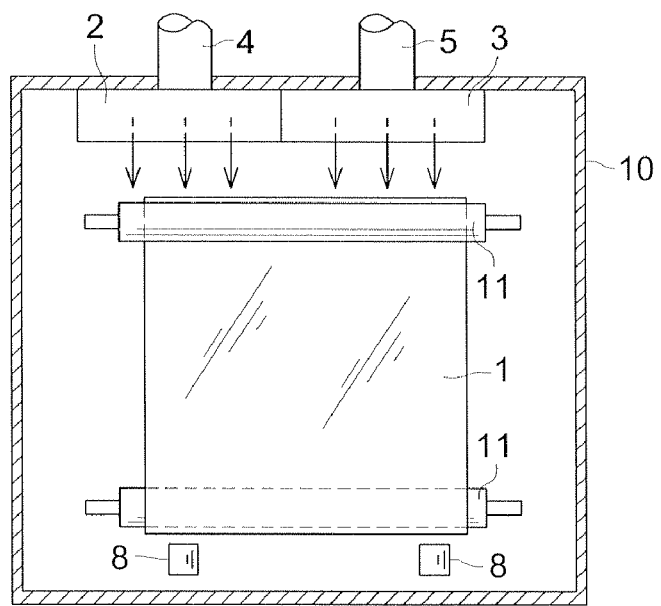
FIG. 5 is a partially enlarged transverse cross sectional view in FIG. 4.

FIGS. 4 and 5 represent the second embodiment of the film drying zone of the solution-casting film-forming apparatus for embodying the optical film manufacturing method of the present invention.

In these drawings, the film (web) 1 having been separated from the support member is passed alternately through a great number of conveyance rolls 11 in a drying chamber 10, and is conveyed. Hot air is sprayed on the film (web), which is then dried.

In this second embodiment, the conveyed film 1 is heated and dried at the ambient temperature of the entire drying box 10 as a drying means, without using the hot air header closed to the film 1 as in the aforementioned first embodiment. Similarly to the case of the first embodiment, the temperature difference along the lateral direction of the film of the atmosphere in the drying box 10 is provided.

To be more specific, the hot air spraying headers (headers for spraying hot air) 2 and 3 designed in a two-split structure capable of spraying two forms of hot air (dry air) having different temperatures along the lateral direction of the conveyed film of the drying box 10 are provided on the inner side of the ceiling of the drying box 10. In the lower portion of the drying box 10, film thickness measuring sensors 8, 8 are provided at two positions close to the conveyed film 1 and along the lateral direction of the film.

Figure 6:
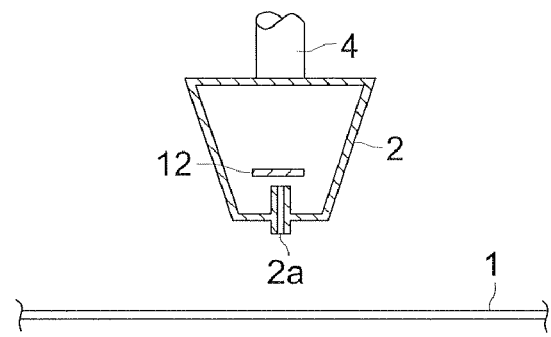
FIG. 6 is a partially enlarged vertical cross sectional view representing the third embodiment of the film drying zone of the solution-casting film-forming apparatus for embodying the optical film manufacturing method of the present invention.
Figure 7:
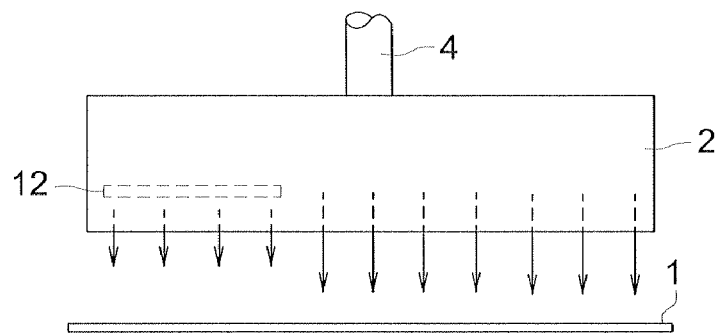
FIG. 7 is a partially enlarged front view in FIG. 6.

FIGS. 6 and 7 represent the third embodiment of the film drying zone of the solution-casting film-forming apparatus for embodying the optical film manufacturing method of the present invention.

The third embodiment takes up the case of adjusting only the velocity or volume of the hot air (dry air), not the temperature of the hot air. As illustrated, a position-variable baffle plate 12 is installed close to the air outlet 2a of the hot air spraying header 2, and is used to adjust the velocity or volume of air blown from the hot air spraying headers 2 and 3.

As described above, according to the present invention, in the drying zone, the right and left headers 2 and 3 (one of them not illustrated) are provided side by side and are capable of adjusting and spraying hot air to provide different air velocity or volume along the lateral direction of the conveyed film; and film thickness measuring sensors 8, 8 (FIG. 1) for measuring the thicknesses along the lateral direction of the conveyed film. Air velocity or volume is adjusted in response to the values for thicknesses along the lateral direction of the conveyed film measured by the aforementioned film thickness measuring sensors 8, 8.

To put it more specifically, it is preferred that the velocity or volume of hot air blown on the thicker portion of the film should be made higher 0.5 to 3.0% per 1 μm of a deviation of the thickness than that on the thinner portion of the film, in response to the values for distribution of thicknesses along the lateral direction of the conveyed film measured by the right and left film thickness measuring sensors 8, 8.

As described above, according to the present invention, lack of uniformity in the thickness variation along the lateral direction of conveyed film 1 in the film making process is measured on the on-line basis, and the hot air velocity or volume blown from the right and left headers 2 and 3 in the film making process is adjusted so as to reduce the lack of uniformity. Even if the conveyed film contains a fine variation in the thickness, this arrangement corrects the lack of uniformity. This procedure ensures high-precision uniformity in the optical value required of an optical film, and produces a high-quality optical film.

The following describes the fourth embodiment of the present invention with reference to FIGS. 1 and 2. As illustrated, the drying zone is provided with hot air spraying headers 2 and 3 which are located close to the conveyed film 1 and side by side along the lateral direction of the conveyed film and are capable of spraying two types of hot air (dry air) having different temperatures along the lateral direction of the conveyed film; and the tension measuring sensors as a measuring means (corresponding to "8, 8") installed at two positions along the lateral direction of the film 1 close to the aforementioned headers 2 and 3 to measure the tension of the conveyed film 1 independently on the right and left As tension measuring sensors (corresponding to 8, 8), it is possible to use the tension sensors for measuring the deformation on the lower portion of the bearing on both ends of the roll, these sensors being commonly used in the roll conveyance control. In the general conveyance process, the total output of the sensors on both ends of the roll is assumed as the conveyance tension. In the present invention, the differences on the right and left cab be detected.

In the present invention, the tensions of the conveyed film (web) 1 on the right and left sides are detected in real time by right and left tension measuring sensors (corresponding to 8, 8), respectively, on the on-line basis. Then the data on the tensions on the right and left having been detected is converted into signals, which are sent to an external data processing apparatus 9 from the right and left tension measuring sensors (corresponding to 8, 8), film thickness measuring sensors on the right and left. Receiving the detection data, the external data processing apparatus 9 obtains actually measured values for the tensions on the right and left of the conveyed film 1, based on this data, and compares the actually measured values. According to the result of this comparison, the hot air temperature blown from the right and left headers 2 and 3 is changed.

In this case, if the conveyance tensions on the right and left sides of the film 1 being conveyed is not uniform, the film having a greater tension tends to be stretched in the direction of conveyance, and lack of uniformity occurs to the retardation value along the lateral direction of the film. To avoid this, dry air temperature and air velocity or volume blown on the side of smaller tension are raised to promote drying. This provides uniform retardation values.

To put it more specifically, it is preferred that hot air temperature blown on the side of smaller tension should be made higher 0.2 to 0.8° C. per 1 N/m of a deviation of the tension than that on the side of greater tension, in response to the values of the tensions on the right and left sides along the lateral direction of the conveyed film 1 measured by the right and left tension measuring sensors (corresponding to 8, 8).

As described above, according to the present invention, lack of uniformity in conveyance tension along the lateral direction of the conveyed film 1 in the film making process is measured on the on-line basis, and the dry air temperature blown from the drying means is adjusted in the film making process so as to reduce the lack of uniformity. Even when there is lack of uniformity in the conveyance tension, this arrangement corrects the lack of uniformity, thereby achieving high-precision uniformity in the optical value required of an optical film, and providing a high-quality optical film.

The following describes the fifth embodiment of the present invention with reference to FIGS. 6 and 7. In these figures, when adjusting only the velocity or volume of the hot air (dry air), not the temperature of the hot air, a position-variable baffle plate 12 is installed close to the air outlet 2a of the hot air spraying header 2, and is used to adjust the velocity or volume of air blown from the air outlet 2a.

In the fifth embodiment of the present invention, the drying zone contains the headers 2 and 3 (one of them not illustrated) which are placed side by side along the lateral direction of the conveyed film and are capable of adjusting hot air to provide different air velocity or volume along the lateral direction of the conveyed film 1; and the tension measuring sensors (corresponding to corresponding to "8, 8") for measuring the tension of the conveyed film 1 independently on the right and left sides, these tension measuring sensors being installed at two positions close to the aforementioned headers 2 and 3 along the lateral direction of the film 1.

In the fifth embodiment of the present invention, the tensions of the conveyed film (web) 1 on the right and left sides are measured in real time by the right and left tension measuring sensors (corresponding to 8, 8) on the on-line basis. Similarly to the case of the aforementioned fourth embodiment, hot air velocity or volume blown from the headers 2 and 3 is adjusted in response to the value of the tensions on the right and left sides of the conveyed film 1 measured by the aforementioned right and left tension measuring sensors (corresponding to 8, 8).

To put it more specifically, it is preferred that hot air velocity or volume on the side of smaller tension should be made higher 0.3 to 0.8% per 1 N/m of a deviation of the tension than that on the side of larger tension, in response to the values of the right and left tensions along the lateral direction of the conveyed film 1 measured by the right and left tension measuring sensors (corresponding to 8, 8).

As described above, according to the present invention, lack of uniformity in conveyance tension along the lateral direction of the conveyed film 1 in the film making process is measured and the dry air velocity or volume blown from the drying means is adjusted in the film making process so as to reduce the lack of uniformity. Even when there is lack of uniformity in the conveyance tension, this arrangement corrects the lack of uniformity, thereby achieving high-precision uniformity in the optical value required of an optical film. Thus, this arrangement manufactures a high-quality optical film.

The following describes the sixth embodiment of the present invention with reference to FIGS. 1 and 2. As illustrated in these figures, the drying zone is provided with hot air spraying headers 2 and 3 which are placed close to the conveyed film 1 and side by side along the lateral direction of the conveyed film and are capable of spraying hot air (dry air) having different temperatures along the lateral direction of the conveyed film; and the sensors (corresponding to "8, 8") for measuring the retardation of the conveyed film independently on the right and left sides, these sensors being installed as a measuring means at two positions close to the aforementioned headers 2 and 3 along the lateral direction of the film 1.

The on-line retardation measuring sensor (KOBRA-W1) by Oji Scientific Instruments can be used to measure the retardation of the film 1 being conveyed.

As described above, according to the sixth embodiment of the present invention, if the values for the retardations of the conveyed film on the right and left sides measured by the sensors (corresponding to "8, 8" in FIG. 1) that measures the retardation of the conveyed film 1 independently on the right and left sides is 2% or more different, the hot air temperature is adjusted along the lateral direction of the film.

To put it more specifically, when the direction of the slow phase axis of the in-plane retardation of the conveyed film 1 is approximately the same as that along the lateral direction of the film (TD direction), and the values for the right and left retardations along the lateral direction of the conveyed film measured by the sensors (corresponding to "8, 8" in FIG. 1) for measuring the retardation of the conveyed film 1 independently on the right and left sides are by 2% or more different, then the hot air temperature blown on the side of smaller retardation is made higher 0.5 to 2.5° C. per 1 nm of a deviation of the retardation value than that blown on the side of greater retardation.

By contrast, when the direction of the slow phase axis of the conveyed film 1 is approximately the same as the direction of conveyance (MD direction), the hot air temperature on the side of smaller retardation is made lower 0.5 to 2.5° C. per 1 nm of a deviation of the retardation value than that blown on the side of greater retardation. This will give the same advantage.

As described above, according to the present invention, lack of uniformity in the right and left retardations of the conveyed film 1 along the lateral direction of the film in the film making process is measured on the on-line basis, and hot air temperature blown from the drying means in the film making process is adjusted so as to reduce the lack of uniformity. Even if the conveyed film contains a fine variation in the retardation, this arrangement corrects the lack of uniformity, thereby achieving high-precision uniformity in the optical value required of an optical film, and providing a high-quality optical film.

The following describes the seventh embodiment of the present invention with reference to FIGS. 6 and 7. In these figures, when adjusting only the velocity or volume of the hot air (dry air), not the temperature of the hot air, a position-variable baffle plate 12 is installed close to the air outlet 2a of the hot air spraying header 2, and is used to adjust the velocity or volume of dry air.

In the seventh embodiment of the present invention, the drying zone is provided with the headers 2 and 3 (one of them not illustrated) as the drying means which are place close to the conveyed film and side by side along the lateral direction and are capable of spraying hot air to provide different air velocities or volumes along the lateral direction of the conveyed film 1; and the tension measuring sensors as a measuring means (corresponding to corresponding to "8, 8" in FIG. 1) for measuring the tension of the conveyed film 1 independently on the right and left sides, these tension measuring sensors being installed at two positions close to and at an upstream side of the aforementioned headers 2 and 3 along the lateral direction of the film 1.

In the seventh embodiment of the present invention, if the values for the retardations of the conveyed film on the right and left sides measured by the sensors (corresponding to "8, 8" in FIG. 1) that measures the retardation of the conveyed film 1 independently on the right and left sides is 2% or more different, the hot air velocity or volume is adjusted within the range of 0.5 to 3% per 1 nm of a deviation of the retardation value along the lateral direction of the film.

To put it more specifically, when the direction of the slow phase axis of the in-plane retardation of the conveyed film 1 is approximately the same as that along the lateral direction of the film (TD direction), and the values for the right and left retardations along the lateral direction of the conveyed film measured by the sensors (corresponding to "8, 8" in FIG. 1) for measuring the retardation of the conveyed film 1 independently on the right and left sides are by 2% or more different, then the hot air velocity or volume blown on the side of smaller retardation is made higher 0.5 to 3% per 1 nm of a deviation of the retardation value than that blown on the side of greater retardation.

By contrast, when the direction of the slow phase axis of the conveyed film 1 is approximately the same as the direction of conveyance (MD direction), the hot air velocity or volume blown on the side of smaller retardation is lower 0.5 to 3% per 1 nm of a deviation of the retardation value than that blown on the side of greater retardation. This will give the same advantage.

As described above, according to the present invention, lack of uniformity in the right and left retardations of the conveyed film 1 along the lateral direction of the film in the film making process is measured on the on-line basis, and hot air velocity and volume along the lateral direction of the film in the film making process is adjusted so as to reduce the lack of uniformity. Even if the conveyed film contains a fine variation in the retardation, this arrangement corrects the lack of uniformity, thereby achieving high-precision uniformity in the optical value required of an optical film and providing a high-quality optical film.

The eighth embodiment of the present invention is a combination of plural embodiments among the first to seventh embodiments stated above. Although various combinations may be considered, a preferable embodiment comprises a first drying process and a second process provided at a downstream side of the first drying process in the conveying direction, and in the first drying process, at least one of the thickness and the tension is measured at the plural positions along the lateral direction of the web and then the web is dried by adjusting drying conditions at the plural positions to differ in accordance with the deviation of the at least one of the thickness and the tension, whereby unevenness in retardation due to unevenness in casting is corrected. Thereafter, in the second drying process, the retardation value is measured at the plural positions along the lateral direction of the web and then the web is dried by adjusting drying conditions at the plural positions to differ in accordance with the deviation of the retardation, whereby it becomes possible to obtain effects that the uniformity of a optical value such as a retardation required for a optical film can be attained with high accuracy and an optical film with excellent quality can be produced.

The optical film of the present invention is produced by any one of the aforementioned manufacturing methods, and is a high-quality optical film wherein the deviation of the retardation value in the plane along the lateral direction of the film and along the thickness is within ±2%, preferably within ±1%.

In the aforementioned description, the temperature, velocity and volume of hot air (dry air) in the drying zone can be adjusted by the two- or three-split structure along the lateral direction of the film as illustrated or by the multi-split structure along the lateral direction of the film (not illustrated).

Similarly, the sensors can be placed at two or more positions along the lateral direction of the film.

Film formation can be performed by measuring the temperature and velocity of the hot air actually sprayed, although this is not illustrated.

In the aforementioned sixth and seventh embodiments of the present invention, the retardation value of the film being conveyed is directly measured, and the temperature and velocity or volume of the hot air (dry air) is adjusted. In the retardation corrected film, the slow phase axis of the retardation is generally parallel or vertical to the direction of the film being conveyed, in response to the type of the liquid crystal to be used. The temperature and velocity or volume of the hot air (dry air) is adjusted along the lateral direction of the film in response to the direction of the slow phase axis of the film, whereby a film characterized by uniform retardation value along the lateral direction of the film can be obtained. Further, the present invention permits fine adjustment of the orientation angle adjusting the temperature and velocity or volume of the hot air (dry air) through observation of the right and left difference in the direction of the slow phase axis of the film (angle with respect to the direction of conveyance).

The drying temperature is generally kept at 40 through 250° C. throughout the process. The drying temperature, the amount of dry air and drying time are different, depending on the solvent to be used. Drying conditions should be selected as appropriate, in response to the type of the solvent to be used and the combination thereof.

Stretching Process

At the stretching step by the tentering device not drawn, the stretching magnification when manufacturing cellulose ester films is 1.01 to 3 times of that in the film forming direction or width direction and preferably 1.5 to 3 times. When stretching biaxially, the stretching magnification on the high-magnification stretching side is 1.01 to 3 times and preferably 1.5 to 3 times, and the stretching magnification in the other direction is 0.8 to 1.5 times and preferably 0.9 to 1.2 times.

Width holding and transverse stretching at the film forming step are preferably executed by the tentering device and either of the pin tenter and clip tenter may be used.

After the stretching step by the tentering device, the post-drying step (post-drying section) is preferably installed. The film transfer tension at the post-drying step is affected by the physical properties of dope, the residual solvent amount at time of separation and at the film transfer step, and the temperature at the post-drying step, though it is preferably 30 to 250 N/m, more preferably 60 to 150 N/m, and most preferably 80 to 120 N/m.

To prevent films from extension in the transfer direction at the post-drying step, a tension cut roll is installed preferably. After end of drying, it is preferable to obtain a good winding posture to install a slitter and cut off the end before winding.

Winding Process

The winding step is a step of winding the web finishing drying as a film 14 by a winder 15 and obtaining an original roll of optical films. The residual solvent amount of the film 14 finishing drying is 0.5 wt % or less, preferably 0.1 wt % or less, thus good films having stable dimensions can be obtained.

The film winding method may use a winder generally used, and there are methods for controlling the tension such as a constant torque method, a constant tension method, a taper tension method, and a program tension control method of fixed internal stress, and those methods may be used appropriately.

The thickness of cellulose ester films varies with the use object and from the viewpoint of a thin liquid crystal display, the thickness of finished films is preferably within the range from 10 to 150 µm, more preferably within the range from 30 to 100 µm, and particularly preferably within the range from 40 to 80 µm.

When films are excessively thin, for example, the strength necessary as a polarizing plate protective film may not be obtained. When films are excessively thick, the superiority of thinness to conventional cellulose ester films is lost. For regulation of the film thickness, to obtain a desired thickness, it is desirable to control the dope concentration, the liquid sending amount of the pump, the slit gap of the head of the casting die 2, the pressing pressure of the casting die 2, and the speed of the support body 3. Further, as a means for making the film thickness uniform, it is desirable to feed back and regulate programmed feedback information to the units aforementioned using a film detection means.

At the steps up to drying immediately after casting by the solvent casting film forming method, the atmosphere in the drier may be air, though an inactive gas atmosphere such as nitrogen gas or carbon dioxide gas may be used. However, needless to say, the danger of the explosion limit of the evaporation solvent in the drying atmosphere must be always taken into account.

Cellulose ester films of the present invention, due to good moisture vapor permeability and dimensional stability, is preferably used as a liquid crystal display member, in detail, a polarizing plate protective film. Particularly, in the polarizing plate protective film strictly requiring the moisture vapor permeability and dimensional stability, the cellulose ester film of the present invention is used preferably.

Generally, when using a cellulose ester film as a polarizing plate protective film, to obtain good adhesion with the polarizer, it is alkaline-saponified. To stick the film after alkaline saponification to the polarizer using a polyvinyl alcohol water solution as an adhesive, when the contact angle of the cellulose ester film after alkaline saponification with water is high, the film cannot be stuck by polyvinyl alcohol, thereby comes into a problem as a polarizing plate protective film.

When using the cellulose ester film manufactured by the method of the present invention as an LCD member, high flatness is required to reduce light leakage of the film. However, the flatness (Ra) of the center line of an optical film is specified in JIS B 0601 and as a measuring method, for example, a stylus method and an optical method may be cited.

According to the present invention, the flatness of center line (Ra) of a cellulose ester film is preferably 20 nm or less, more preferably 10 nm or less, and particularly preferably 4 nm or less.

Next, the polarizing plate using a cellulose ester film manufactured by the method of the present invention as a polarizing plate protective film and the liquid crystal display using the concerned polarizing plate will be explained.

The polarizing plate can be prepared by a general method. The cellulose ester film alkaline-saponified of the present invention is preferably stuck to at least one surface of a polarizer prepared by immersing and stretching a polyvinyl alcohol film in an iodine solution using a perfect saponifiable polyvinyl alcohol water solution. Also for the other surface, the cellulose ester film of the present invention may be used or another polarizing plate protective film may be used. For the cellulose ester film of the present invention, the polarizing plate protective film used for the other surface may use a cellulose ester film on sale. For example, as a cellulose ester film on sale, KC8UX2M, KC4UX, KC5UX, KC4UY, KC8UY, KC12UR, KC8UY-HA, KC8UX-RHA, and KC8UX-RHA-N (these are all manufactured by Konica Minolta Opto Co., Ltd.) are used preferably. Or, films of cyclic olefin resin, acryl resin, polyester, and polycarbonate other than a cellulose ester film may be used as a polarizing plate protective film of the other surface. In this case, the saponification suitability is low, so that it is preferable to stick it to the polarizing plate via an appropriate bonding layer.

In the polarizing plate of the present invention, the cellulose ester film of the present invention is used as a polarizing plate protective film on at least one of the polarizer. At this time, it is preferable to arrange the lagging axis of the cellulose ester film so as to be practically parallel with or orthogonal to the absorption axis of the polarizer.

It is preferable to use this polarizing plate as another polarizing plate arranged across the liquid crystal cell of a horizontal electric field switching mode type and arrange the cellulose ester film of the present invention on the liquid crystal display cell side.

As a polarizer used for the polarizing plate of the present invention, a polyvinyl alcohol polarizing film may be cited and it is dyed with a two-color dye together with a polyvinyl alcohol film dyed with iodine. As a polyvinyl alcohol film, a denatured polyvinyl alcohol film denatured by ethylene is used preferably. As a polarizer, a polyvinyl alcohol water solution is formed to a film, is stretched monoaxially and dyed, or dyed and stretched monoaxially, and then is preferably durable-processed by a boron compound.

The film thickness of the polarizer is 5 to 40 µm, preferably 5 to 30 µm, and particularly preferably 5 to 20 µm. Onto the surface of the concerned polarizer, one side of the cellulose ester film of the present invention is stuck to form a polarizer. It is preferable to stick it using an aqueous adhesive having a main component of perfect saponifiable polyvinyl alcohol. Further, when using a resin film other than a cellulose ester film, it can be stuck to the polarizing plate via an appropriate adhesive layer.

The polarizer is stretched monoaxially (generally in the longitudinal direction), so that when the polarizing plate is put in an environment of high temperature and high humidity, it contracts in the stretching direction (generally in the longitudinal direction) and stretches in the direction perpendicular to stretching (generally in the width direction). As the polarizing plate protective film becomes thinner, the degree of stretching of the polarizing plate increases and particularly the degree of shrinkage of the polarizer in the stretching direction is high. Generally, the stretching direction of the polarizer is stuck to the casting direction (MD direction) of the polarizing plate protective film, so that when making the polarizing plate protective film thinner, particularly it is important to suppress the degree of stretching in the casting direction. The cellulose ester film of the present invention is excellent in the dimensional stability, so that it is preferably used as such a polarizing plate protective film.

The polarizing plate can be formed additionally by sticking a protect film onto one surface of the polarizing plate and a separate film onto the opposite surface. The protect film and separate film, at time of shipment of the polarizing plate and product inspection, is used to protect the polarizing plate.

The optical films of the present invention have an excellent surface quality which is superior in the flatness and is free of failures such as bubble detects and a liquid crystal display using an optical film prepared by the present invention has an excellent quality free of irregularities on the screen.

EXAMPLE

The following describes the details of the present invention with reference to Examples, without the present invention being restricted thereto.

Example 1

Before manufacturing the cellulose acetate propionate film having a target dry thickness of 80 μm according to the solution-casting film-forming method based on the method of manufacturing the optical film of the present invention, firstly a doping solution was prepared.

(Preparation of Dope)

The cellulose triacetate propionate dope was prepared as follows:

| | |
|---|---|
| Cellulose triacetate propionate | 100 parts by weight |
| (Acetyl group replacement ratio of 1.95 and propionyl group replacement ratio of 0.7) | 100 parts by mass |
| Triphenyl phosphate | 10 parts by weight |
| Ethylphthalylethylglycolate | 2 parts by weight |
| TINUVIN 326 | 1 parts by weight |
| (by Ciba Specialty Chemicals K.K) | |
| AEROSIL 200V (Nippon Aerosil Co., Ltd.) | 0.1 parts by weight |
| Methylene chloride | 300 parts by weight |
| Ethanol | 40 parts by weight |

The dope was prepared by taking the steps of: putting the aforementioned materials sequentially into the enclosed container; raising the temperature inside the container from 20° C. to 80° C.; and stirring the mixture for three hours with the temperature kept at 80° C. until the cellulose triacetate propionate was completely dissolved. After that, stirring was stopped and the solution temperature was reduced down to 43° C. This was followed by the steps of sending this dope solution to a filtering device, where it was filtered by filter paper (Filter Paper Azumi No. 244 by AZUMI FILTERPAPER CO., LTD). This procedure provided cast dope.

The dope having been prepared by the aforementioned steps was flow-cast onto a support member made up of a stainless steel endless belt through a casting die with its temperature kept at 35° C., whereby a film (web) was formed. The film was dried on the support member until the amount of solvent remaining in the web was reduced to 80 wt %, and was then separated from the support member by a delamination roll. This was followed by the steps of the film being dried during conveyance by a roll and being taken up by a winder. This procedure produced a cellulose triacetate propionate film.

In Example 1, as shown in FIGS. 1 and 2, the solution-casting film-forming apparatus for embodying the present invention comprises, in the drying zone, hot air spraying headers 2 and 3 which are placed close to the conveyed film 1 side by side along the lateral direction of the conveyed film and are capable of spraying hot air (dry air) having different temperatures; and two film thickness measuring sensors 8, 8 installed at two positions along the lateral direction of the film 1 close to the aforementioned headers 2 and 3 to measure the thickness of the conveyed film 1.

Laser focus type displacement sensors (LT-8010 by Keyence Corp.) were used as the aforementioned film thickness measuring sensors 8, 8.

In this Example 1, the thicknesses of the conveyed film (web) 1 on the right and left were detected in real time by the film thickness measuring sensors 8, 8 on the right and left, respectively, on the on-line basis. The data on the thicknesses of the conveyed film on the right and left having been detected was converted into signals, which were sent to an external data processing apparatus 9 from the film thickness measuring sensors 8, 8 on the right and left. Receiving the detection data, the external data processing apparatus 9 obtained actually measured values for the film thicknesses on the right and left of the conveyed film 1, based on this data, and compared the actually measured values. According to the result of this comparison, the difference on film thicknesses on the right and left sides was 2 μm.

Thus, the temperature of hot air on the thicker portion of the film was made higher than that of hot air on the thinner portion of the film by 3° C.

It should be noted that the difference in the velocities of hot air (dry air) sprayed from the right and left headers 2 and 3 did not exceed 2%.

Example 2

Example 2 was conducted with the same manner as Example 1 except that in Example 2, a temperature of a hot air blown onto a thicker portion of a film thickness was set 5° C. higher than that of a hot air blown onto a thinner portion of a film thickness, being relatively higher than Example 1.

The cellulose triacetate propionate films of Examples 1 and 2 prepared according to the aforementioned procedure were tested as follows: A retardation measuring sensor (KOBRA-WX by Oji Scientific Instruments) was used to measure the retardation along the lateral direction of the film at an interval of 50 mm, and the maximum and minimum values of the retardations along the lateral direction of the film. The results are given in the following Table 1.

Comparative Example 1

For the sake of comparison, the same procedure as that used in the aforementioned Example 1 was used. As shown in Table 1, in the Comparative Example 1, each of the differences in the thicknesses of the conveyed film on the right and left sides was 2 μm. In the Comparative Example 1, the adjustment according to the present invention to provide a difference between the hot air temperature on the thicker portion of the film and that on the thinner portion of the film was not conducted.

It should be noted that the difference in the velocities of hot air (dry air) sprayed from the right and left headers 2 and 3 did not exceed 2%.

The cellulose triacetate propionate film of Comparative Example 1 prepared according to the aforementioned procedure was tested in the same way as the aforementioned Example 1. Namely, the retardation along the lateral direction of the film and the maximum and minimum values of the retardations along the lateral direction of the film were measured. The results are also given in the following Table 1.

TABLE 1

| | Difference in film thickness (μm) | Difference in temperatures (° C.) | Difference in retardation (nm) |
|---|---|---|---|
| Example 1 | 2 | 3 | 1.2 |
| Example 2 | 2 | 5 | 1.4 |
| Comparative Example 1 | 2 | Less than 1 | 3.2 |

Example 3

In Example 2, the cellulose triacetate propionate film was produced similarly to the manner of Example 1. The difference in the manner from that used in the Example 1 is that the apparatus shown in FIGS. 6 and 7 was used to adjust the velocity of the hot air (dry air)—not the temperature of the hot air (dry air). A position-variable baffle plate 12 was installed close to the air outlet 2a of the hot air spraying header 2 to adjust the velocity of a dry air.

As described above, according to the Example 3 of the present invention, the solution-casting film-forming apparatus for embodying the method of the present invention comprises, in the drying zone, right and left headers 2 and 3 provided side by side along the lateral direction of the conveyed film and for spraying hot airs with different air velocities; and film thickness measuring sensors 8, 8 (refer FIG. 1) for measuring thicknesses of the conveyed film. The velocity of the hot airs are adjusted in response to the value of thicknesses along the lateral direction of the conveyed film measured by the aforementioned film thickness measuring sensors 8, 8. The actually measured values for the film thicknesses on the right and left of the conveyed film 1 are obtained and compared. According to the result of this comparison, the difference on film thicknesses on the right and left sides was 2 μm.

Thus, the velocity of hot air on the thicker portion of the film was made higher than that of hot air on the thinner portion of the film by 3%.

It should be noted that the difference in the temperatures of hot air (dry air) sprayed from the right and left headers 2 and 3 was less than 1° C.

Example 4

Example 4 was conducted with the same manner as Example 3 except that in Example 4, a velocity of a hot air blown onto a thicker portion of a film thickness was set 5% higher than that of a hot air blown onto a thinner portion of a film thickness, so as to be relatively higher than Example 3.

The cellulose triacetate propionate films of Examples 3 and 4 prepared according to the aforementioned procedure were tested in the same way as the aforementioned Example 1. Namely, the retardation along the lateral direction of the film and the maximum and minimum values of the retardations along the lateral direction of the film were measured. The results are also given in the following Table 2.

Comparative Example 2

For the sake of comparison, the same procedure as that used in the aforementioned Example 2 was used. As shown in Table 1, the difference in the thicknesses of the conveyed film on the right and left sides was 2 μm. In Comparative Example 2, the adjustment according to the present invention to provide a difference between the hot air velocity on the thicker portion of the film and that on the thinner portion of the film was not conducted.

It should be noted that the difference in the temperatures of hot air sprayed from the right and left headers 2 and 3 was less than 1° C.

The cellulose triacetate propionate film of Comparative Example 2 prepared according to the aforementioned procedure was tested in the same way as the aforementioned Example 1. Namely, the retardation along the lateral direction of the film and the maximum and minimum values of the retardations along the lateral direction of the film were measured. The results are also given in the following Table 2.

TABLE 2

|  | Difference in film thickness (μm) | Difference in air velocity (%) | Difference in retardation (nm) |
| --- | --- | --- | --- |
| Example 3 | 2 | 3 | 1.0 |
| Example 4 | 2 | 5 | 1.2 |
| Comparative Example 2 | 2 | Less than 1 | 3.3 |

As is clear from the results shown in the aforementioned Tables 1 and 2, the cellulose triacetate propionate film of the Examples 1 and 3 according to the present invention has been demonstrated as a high-quality product of excellent retardation characteristics since the maximum and minimum values for retardations along the lateral direction of the film were as small as 1.2 nm and 1.0 nm. This verifies that the cellulose acetate propionate film of the Examples 1 and 2 is perfectly suited for use as an optical film for liquid crystal display apparatus (LCD).

By contrast, in the cellulose acetate propionate film of the Comparative Examples 1 and 2, the differences in the maximum and minimum values for retardation along the lateral direction of the film were as large as 3.2 nm and 3.3 nm. Thus, the cellulose acetate propionate film of Comparative Examples 1 through 3 is disqualified as a high-quality product, and is hence not suited for use as an optical film for LCD.

Incidentally, in Example 2 in which the difference in temperature was set relatively higher than Example 1 and in Example 4 in which the difference in velocity was set relatively higher than Example 3, there was observed a tendency that the difference in retardation became slightly large to an extent not to cause a problem. Therefore, it may be preferable to adjust the difference in temperature within a range of 0.5 to 3.0° C. per 1 μm of a deviation of a thickness or to adjust the difference in velocity within a range of 0.5 to 3.0% per 1 μm of a deviation of a thickness.

Example 5

In Example 5, as shown in FIGS. 1 and 2, the solution-casting film-forming apparatus for embodying the present invention comprises, in the drying zone, hot air spraying headers 2 and 3 which are placed close to the conveyed film 1 side by side along the lateral direction of the conveyed film and are capable of spraying hot air (dry air) having different temperatures; and two tension measuring sensors (corresponding to "8, 8" in FIG. 1) installed at two positions along the lateral direction of the film 1 close to the aforementioned headers 2 and 3 to measure the tension of the conveyed film 1 independently on the right and left sides.

In this case, a tension measuring device (MB05A by Nireco Inc.) is used as the aforementioned tension measuring sensors (corresponding to 8, 8).

In the Example 5, the tensions of the conveyed film (web) 1 on the right and left sides were measured by the tension measuring sensors 8, 8 on the right and left sides, respectively, on the on-line basis in real time. The data on the tension on the right and left having been detected was converted into signals, which were sent to an external data processing apparatus 9 from the tension measuring sensors 8, 8 on the right and left. Receiving the detection data, the external data processing apparatus 9 obtained actually measured values for the tensions on the right and left of the conveyed film 1, based on this data, and compared the actually measured values. According to the result of this comparison, the difference on tensions on the right and left sides was 8 N/m.

Thus, the temperature of hot air blown on the smaller tension was made higher than that of hot air blown on the greater portion by 3.5° C.

It should be noted that the difference in the velocities of hot air sprayed from the right and left headers 2 and 3 did not exceed 2%.

Example 6

Example 6 was conducted with the same manner as Example 5 except that in Example 6, a temperature of a hot air blown onto a smaller tension side was set 5° C. higher than that of a hot air blown onto a larger tension side, so as to be relatively higher than Example 5.

The cellulose triacetate propionate films of Example 5 and 6 prepared according to the aforementioned procedure were tested as follows: Similarly to the case of the aforementioned Example 1, the retardation along the lateral direction of the film and the maximum and minimum values of the retardations along the lateral direction of the film were measured. The results are also given in the following Table 3.

Comparative Example 3

For the sake of comparison, the same procedure as that used in the aforementioned Example 3 was used. As shown in Table 2, in Comparative Examples 4 and 5, the difference in the tensions of the conveyed film on the right and left sides was 8N/width 2 μm. In the Comparative Example 3, the adjustment according to the present invention to provide a difference between the hot air temperature on the smaller tension side of the film and that on the greater tension side of the film was not conducted.

It should be noted that the difference in the velocities of hot air sprayed from the right and left headers 2 and 3 did not exceed 2%.

The cellulose triacetate propionate film of Comparative Examples 4 and 5 prepared according to the aforementioned procedure was tested in the same way as the aforementioned Example 1. Namely, the retardation along the lateral direction of the film and the maximum and minimum values of the retardations along the lateral direction of the film were measured. The results are also given in the following Table 3.

TABLE 3

|  | Difference in tension (N/m) | Difference in temperatures (° C.) | Difference in retardation (nm) |
|---|---|---|---|
| Example 5 | 8 | 3.5 | 0.9 |
| Example 6 | 8 | 5 | 1.1 |
| Comparative Example 3 | 8 | Less than 1 | 2.8 |

Example 7

In Example 7, the cellulose triacetate propionate film was produced similarly to the manner of Example 5. The difference in the manner from that used in the Example 5 is that the apparatus shown in FIGS. 6 and 7 was used to adjust the velocity of the hot air (dry air)—not the temperature of the hot air (dry air). A position-variable baffle plate 12 was installed close to the air outlet 2a of the hot air spraying header 2 to adjust the velocity of dry air.

As described above, according to the Example 4 of the present invention, the solution-casting film-forming apparatus for embodying the method of the present invention comprises, in the drying zone, right and left headers 2 and 3 provided side by side along the lateral direction of the conveyed film and capable of spraying hot air with different air velocities; and film tension measuring sensors 8, 8 (refer FIG. 1) for measuring the tensions of the conveyed film. The velocity of the hot air is adjusted in response to the measurement values of tensions along the lateral direction of the conveyed film measured by the aforementioned film tension measuring sensors 8, 8. The actually measured values for the film tensions on the right and left of the conveyed film 1 are obtained and compared. According to the result of this comparison, the difference on film tensions on the right and left sides was 8 N/m.

Thus, the velocity of hot air blown on the smaller tension side was made higher than that of hot air blown on the greater tension side of the film by 4.5%.

It should be noted that the difference in the temperatures of hot air (dry air) sprayed from the right and left headers 2 and 3 was less than 1° C.

Example 8

Example 4 was conducted with the same manner as Example 3 except that in Example 4, a velocity of a hot air blown onto a smaller tension side of a film was set 6% higher than that of a hot air blown onto a greater tension side of a film, so as to be relatively higher than Example 7.

The cellulose triacetate propionate films of Examples 7 and 8 prepared according to the aforementioned procedure were tested in the same way as the aforementioned Example 1. Namely, the retardation along the lateral direction of the film and the maximum and minimum values of the retardations along the lateral direction of the film were measured. The results are also given in the following Table 4.

Comparative Example 4

For the sake of comparison, the same procedure as that used in the aforementioned Example 7 was used. As shown in Table 4, the difference in the tension of the conveyed film on the right and left sides was 8 N/m. In the Comparative Example 4, the adjustment according to the present invention to provide a difference between the hot air velocity on the smaller tension side of the film and that on the greater tension side of the film was not conducted.

It should be noted that the difference in the temperatures of hot air sprayed from the right and left headers 2 and 3 was less than 1° C.

The cellulose triacetate propionate film of Comparative Example 4 prepared according to the aforementioned procedure was tested in the same way as the aforementioned Example 7. Namely, the retardation along the lateral direction of the film and the maximum and minimum values of the retardations along the lateral direction of the film were measured. The results are also given in the following Table 4.

TABLE 4

|  | Difference in tension (N/m) | Difference in air velocity (%) | Difference in retardation (nm) |
|---|---|---|---|
| Example 7 | 8 | 4.5 | 0.8 |
| Example 8 | 8 | 6 | 1.1 |
| Comparative Example 4 | 8 | Less than 1 | 2.9 |

As is clear from the results shown in the aforementioned Tables 3 and 4, the cellulose triacetate propionate film of the Examples 5 and 7 according to the present invention has been demonstrated as a high-quality product of excellent retardation characteristics since the maximum and minimum values for retardations along the lateral direction of the film were as small as 0.9 nm and 0.8 nm. This verifies that the cellulose acetate propionate film of the Examples 4 and 7 is perfectly suited for use as an optical film for LCD.

By contrast, in the cellulose acetate propionate film of the Comparative Examples 3 and 4, the differences in the maximum and minimum values for retardation along the lateral direction of the film were as large as 2.8 nm and 2.9 nm. Thus, the cellulose acetate propionate films of Comparative Examples 3 and 4 is disqualified as a high-quality product, and is hence not suited for use as an optical film for LCD.

Incidentally, in Example 6 in which the difference in temperature was set relatively higher than Example 5 and in Example 8 in which the difference in velocity was set relatively higher than Example 7, there was observed a tendency that the difference in retardation became slightly large to an extent not to cause a problem. Therefore, it may be preferable to adjust the difference in temperature within a range of 0.2 to 0.8° C. per 1 N of a deviation of a tension or to adjust the difference in velocity within a range of 0.3 to 0.8% per 1 N of a deviation of a tension.

Example 9

In Example 9, as shown in FIGS. 1 and 2, the solution-casting film-forming apparatus for embodying the present invention comprises, in the drying zone, hot air spraying headers 2 and 3 which are placed close to the conveyed film 1 side by side along the lateral direction of the conveyed film and are capable of spraying two types of hot air (dry air) having different temperatures; and two retardation measuring sensors (corresponding to "8, 8" in FIG. 1) installed at two positions along the lateral direction of the conveyed film 1 close to the aforementioned headers 2 and 3 to measure the retardation of the conveyed film 1 independently on the right and left sides.

In this case, an on-line retardation measuring sensor (KOBRA-W1 by Oji Scientific Instruments) was used to measure the retardation of the conveyed film on the right and left sides.

In the Example 5, the retardations of the conveyed film (web) 1 on the right and left sides were measured by the retardation measuring sensors 8, 8 on the right and left sides, respectively, on the on-line basis in real time. The data on the retardation on the right and left having been detected was converted into signals, which were sent to an external data processing apparatus 9 from the retardation measuring sensors 8, 8 on the right and left. Receiving the detection data, the external data processing apparatus 9 obtained actually measured values for the retardations on the right and left of the conveyed film 1, based on this data, and compared the actually measured values. According to the result of this comparison, the difference on retardations on the right and left sides was 2.5 nm. At this time, the direction of the slow phase axis was the same with the lateral direction of the film 1.

Thus, the temperature of hot air blown on a side having a smaller retardation value was made higher than that of hot air blown on a side having a greater retardation value by 2.5° C.

Example 10

Example 10 was conducted with the same manner as Example 9 except that in Example 9, a temperature of a hot air blown onto a side of a film having a smaller retardation value was set 4.0° C. higher than that of a hot air blown onto a side of a film having a greater retardation value, so as to be relatively higher than Example 9.

It should be noted that the difference in the velocities of hot air (dry air) sprayed from the right and left headers 2 and 3 did not exceed 2%.

The cellulose triacetate propionate films of Examples 9 and 10 prepared according to the aforementioned procedure were tested as follows: Similarly to the case of the aforementioned Example 1, the retardation along the lateral direction of the film and the maximum and minimum values of the retardations along the lateral direction of the film were measured. The results are also given in the following Table 5.

Comparative Example 5

For the sake of comparison, the same procedure as that used in the aforementioned Example 9 was used. As shown in Table 5, the difference in the retardations of the conveyed film on the right and left sides was 2.5 nm. In the Comparative Example 4, the adjustment according to the present invention to provide a difference between a temperature of hot air blown on a side of a film having a smaller retardation value and that of hot air blown on a side of a film having a greater retardation value was not conducted.

It should be noted that the difference in the velocities of hot air sprayed from the right and left headers 2 and 3 did riot exceed 2%.

The cellulose triacetate propionate film of Comparative Example 5 prepared according to the aforementioned procedure was tested in the same way as the aforementioned Example 1. Namely, retardation values along the lateral direction of the film were measured and the maximum and minimum values of the retardations along the lateral direction of the film were measured. The results are also given in the following Table 5.

TABLE 5

|  | Difference in retardation (nm) | Difference in temperature (° C.) | Difference in retardation (nm) |
| --- | --- | --- | --- |
| Example 9 | 2.5 | 2.5 | 0.5 |
| Example 10 | 2.5 | 5 | 0.7 |
| Comparative Example 5 | 2.5 | Less than 1 | 2.5 |

Example 11

In Example 11, the cellulose triacetate propionate film was produced similarly to the manner of Example 9. The difference in the manner from that used in the Example 9 is that the apparatus shown in FIGS. 6 and 7 was used to adjust the velocity of the hot air (dry air)—not the temperature of the hot air (dry air). A position-variable baffle plate 12 was installed close to the air outlet 2a of the hot air spraying header 2 to adjust the velocity of the air.

As described above, according to the Example 11 of the present invention, the solution-casting film-forming apparatus for embodying the method of the present invention comprises, the drying zone, right and left headers 2 and 3 which are provided side by side along the lateral direction of film and are capable of spraying hot air with different velocities; and two retardation measuring sensors (corresponding to "8, 8" in FIG. 1) installed at two positions along the lateral direction of film 1 close to the aforementioned headers 2 and 3 to measure the retardation of the conveyed film 1 independently on the right and left sides. The velocity of the hot air is adjusted in response to the value of retardations along the lateral direction of film 1 measured by the aforementioned film retardation measuring sensors 8, 8. The actually measured values for the film retardations on the right and left of the conveyed film 1 are obtained and compared. According to the result of this comparison, the difference on film retardations on the right and left sides was 2.5 nm. At this time, the direction of the slow phase axis was the same with the lateral direction of the film 1.

Thus, the velocity of hot air blown on a side having a smaller retardation was made higher than that of hot air blown on a side having a greater retardation of the film by 3.5%.

It should be noted that the difference in the temperatures of hot air (dry air) sprayed from the right and left headers 2 and 3 was less than 1° C.

Example 12

Example 12 was conducted with the same manner as Example 11 except that in Example 12, a velocity of a hot air blown onto a side of a film having a smaller retardation value was set 5% higher than that of a hot air blown onto a side of a film having a greater retardation value, so as to be relatively higher than Example 11.

The cellulose triacetate propionate films of Examples 11 and 12 prepared according to the aforementioned procedure was tested in the same way as the aforementioned Example 1. Namely, the retardation values along the lateral direction of the film and the maximum and minimum values of the retardations along the lateral direction of the film were measured. The results are also given in the following Table 6.

Comparative Example 6

For the sake of comparison, the same procedure as that used in the aforementioned Example 11 was used. As shown in Table 6, the difference in the retardations of the conveyed film on the right and left sides was 2.5 nm. In the Comparative Example 6, the adjustment according to the present invention to provide a difference between a velocity of hot air blown on a side of a film having a smaller retardation value and that of hot air blown on a side of a film having a greater retardation value was not conducted.

TABLE 6

|  | Difference in retardation (nm) | Difference in temperature (° C.) | Difference in retardation (nm) |
| --- | --- | --- | --- |
| Example 11 | 2.5 | 3 | 0.6 |
| Example 12 | 2.5 | 5 | 0.8 |
| Comparative Example 6 | 2.5 | Less than 1 | 2.5 |

As is clear from the results shown in the aforementioned Tables 5 and 6, the cellulose triacetate propionate films of the Examples 9 and 11 according to the present invention has been demonstrated as a high-quality product of excellent retardation characteristics since the maximum and minimum values for retardations were as small as 0.5 nm and 0.6 nm. This verifies that the cellulose acetate propionate film of the Examples 9 and 11 is perfectly suited for use as an optical film for LCD.

By contrast, in the cellulose acetate propionate film of the Comparative Examples 5 and 6, the difference in the maximum and minimum values for retardation along the lateral direction of the film was as large as 2.5 nm. Thus, the cellulose acetate propionate film of Comparative Examples 5 and 6 are disqualified as a high-quality product, and is hence not suited for use as an optical film for LCD.

Incidentally, in Example 10 in which the difference in temperature was set relatively higher than Example 9 and in Example 12 in which the difference in velocity was set relatively higher than Example 11, there was observed a tendency that the difference in retardation became slightly large to an extent not to cause a problem. Therefore, it may be preferable to adjust the difference in temperature within a range of 0.5 to 2.5° C. per 1 nm of a deviation of a retardation value or to adjust the difference in velocity within a range of 0.5 to 3.0% per 1 nm of a deviation of a retardation value. Incidentally, although the direction of the slow phase axis was the same with the lateral direction of the film in Example 9 and 11, when the direction of the slow phase axis was the almost same with the conveying direction of the film, the same effect can be obtained by making the temperature, the velocity or the amount of a hot air blown on a side having a greater retardation value.

What is claimed is:

1. An optical film manufacturing method, comprising:
   casting a dope in which a thermoplastic resin is dissolved in a solvent, on a support so as to form a web;
   peeling and conveying the web from the support;
   measuring a physical property of the conveyed web at plural positions along a lateral direction of the web and obtaining a deviation among plural measurement values of the physical property at the plural positions; and
   drying the web by adjusting drying conditions at the plural positions along the lateral direction of the web so as to differ in accordance with the deviation.

2. The optical film manufacturing method of claim 1, wherein at least one of a thickness, a tension and a retardation value is measured as the physical property.

3. The optical film manufacturing method of claim 1, wherein the drying conditions at the plural positions are adjusted to differ such that a deviation among retardation valued at the plural positions of the web after drying is minimized.

4. The optical film manufacturing method of claim 3, wherein at least one of a temperature, a velocity and a amount of a hot air is made to differ as the different drying condition among the plural positions.

5. The optical film manufacturing method of claim 4, wherein the temperature of the hot air is changed from 0.5 to 3.0° C. per 1 μm of a deviation of the thickness.

6. The optical film manufacturing method of claim 4, wherein the temperature of the hot air is changed from 0.2 to 0.8° C. per 1 N/m of a deviation of the tension.

7. The optical film manufacturing method of claim 4, wherein the temperature of the hot air is changed from 0.5 to 2.5° C. per 1 nm of a deviation of the retardation value.

8. The optical film manufacturing method of claim 7, wherein when the direction of a slow phase axis of a in-plane retardation substantially coincides with the lateral direction of the web, the temperature of a hot air blown onto a smaller side of the retardation value is set higher than that of a hot air blown onto a larger side of the retardation value.

9. The optical film manufacturing method of claim 7, wherein when the direction of a slow phase axis of a in-plane retardation substantially coincides with the conveying direction of the web, the temperature of a hot air blown onto a smaller side of the retardation value is set lower than that of a hot air blown onto a larger side of the retardation value.

10. The optical film manufacturing method of claim 4, wherein the velocity or the amount of the hot air is changed from 0.5 to 3.0% per 1 μm of a deviation of the thickness.

11. The optical film manufacturing method of claim 4, wherein the velocity or the amount of the hot air is changed from 0.3 to 0.8% per 1 N/m of a deviation of the tension.

12. The optical film manufacturing method of claim 4, wherein the velocity or the amount of the hot air is changed from 0.5 to 3% per 1 nm of a deviation of the retardation value.

13. The optical film manufacturing method of claim 1, wherein the drying step comprises a first drying process and a second process provided at a downstream side of the first drying process in the conveying direction, and wherein in the first drying process, at least one of the thickness and the tension is measured at the plural positions along the lateral direction of the web and the web is dried by adjusting drying conditions at the plural positions to differ in accordance with the deviation of the at least one of the thickness and the tension, and in the second drying process, the retardation value is measured at the plural positions along the lateral direction of the web and the web is dried by adjusting drying conditions at the plural positions to differ in accordance with the deviation of the retardation.

14. The optical film manufacturing method of claim 1, wherein the measuring step is conducted at a position located upstream of that of the drying step in terms of the web conveying direction.

15. The optical film manufacturing method of claim 1, wherein the drying step is conducted to equalize the physical property along the lateral direction of the web.

* * * * *